(12) United States Patent
Muneishi et al.

(10) Patent No.: US 7,710,549 B2
(45) Date of Patent: May 4, 2010

(54) APPARATUS FOR DETECTING SPEED OF MOVABLE BODY AND DRIVE STAGE USING THE SAME

(75) Inventors: Takeshi Muneishi, Higashiomi (JP); Akira Komoto, Otsu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/816,819

(22) PCT Filed: Nov. 25, 2005

(86) PCT No.: PCT/JP2005/021701
§ 371 (c)(1),
(2), (4) Date: Oct. 27, 2008

(87) PCT Pub. No.: WO2006/090517
PCT Pub. Date: Aug. 31, 2006

(65) Prior Publication Data
US 2009/0040504 A1    Feb. 12, 2009

(30) Foreign Application Priority Data
Feb. 23, 2005    (JP) .............................. 2005-047456

(51) Int. Cl.
G01P 3/36    (2006.01)
G01C 21/10    (2006.01)
(52) U.S. Cl. ........................ 356/28; 356/4.07; 250/206.3
(58) Field of Classification Search ................ 356/4.07, 356/28, 28.5, 614; 256/203.7, 206.1, 206.2, 256/206.3
See application file for complete search history.

(56) References Cited

U.S. PATENT DOCUMENTS

| | | | |
|---|---|---|---|
| 4,435,702 A * | 3/1984 | Imai ............................ | 340/671 |
| 7,242,789 B2 * | 7/2007 | Takayasu et al. ............ | 382/100 |
| 7,586,587 B1 * | 9/2009 | Wang et al. ................. | 356/28.5 |
| 2005/0072902 A1 * | 4/2005 | Visee ........................ | 250/208.1 |
| 2009/0122293 A1 * | 5/2009 | Shibazaki ..................... | 355/73 |

FOREIGN PATENT DOCUMENTS

| | | |
|---|---|---|
| JP | 54-009977 | 1/1979 |
| JP | 01-178869 | 7/1989 |
| JP | 01-297557 | 11/1989 |
| JP | 02-090018 | 3/1990 |
| JP | 02-112724 | 4/1990 |
| JP | 09-126720 | 5/1997 |
| JP | 2007040893 A * | 2/2007 |

* cited by examiner

*Primary Examiner*—Isam Alsomiri
(74) *Attorney, Agent, or Firm*—Hogan & Hartson LLP

(57) ABSTRACT

A movable-body-speed-detecting apparatus includes a movable body capable of moving linearly and/or circularly, a plate fixed to the movable body, the plate having a predetermined length in a direction in which the movable body moves, and light emission/reception means arranged such that light output from a light-emitting element enters a light-receiving element. The plate has a window section that passes between the light-emitting element and the light-receiving element in accordance with movement of the movable body and that blocks or allows passage of light to the light-receiving element. The apparatus further comprises speed calculation means for calculating the speed of the movable body by converting the amount of light received by the light-receiving element into a signal and measuring the signal.

17 Claims, 26 Drawing Sheets

FIG. 6
(a) DETECTED VOLTAGE FROM LIGHT-RECEIVING ELEMENT
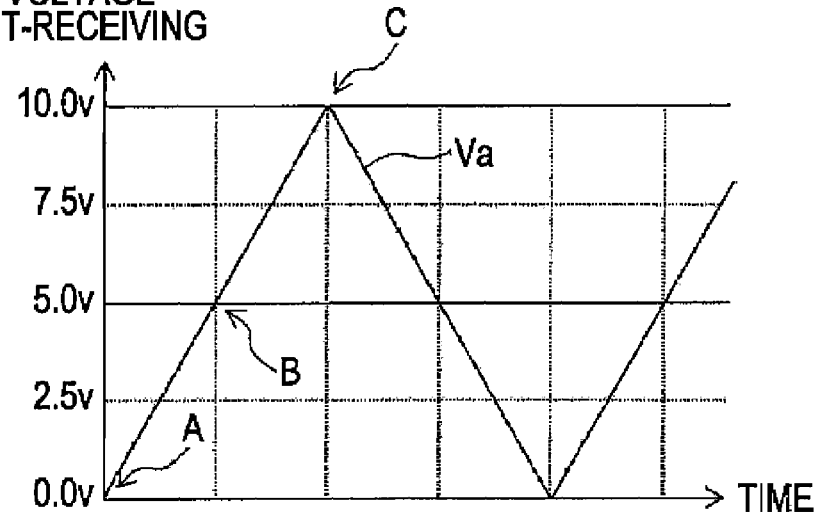
(b) DIFFERENTIAL SIGNAL
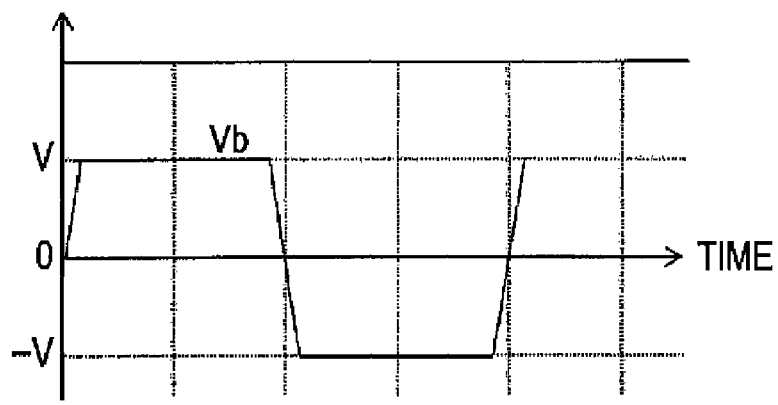
(c) SPEED PROPORTIONAL SIGNAL
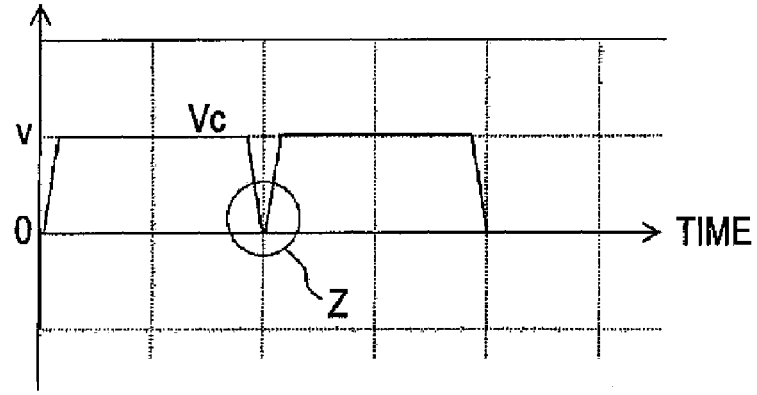

FIG. 8
(a)
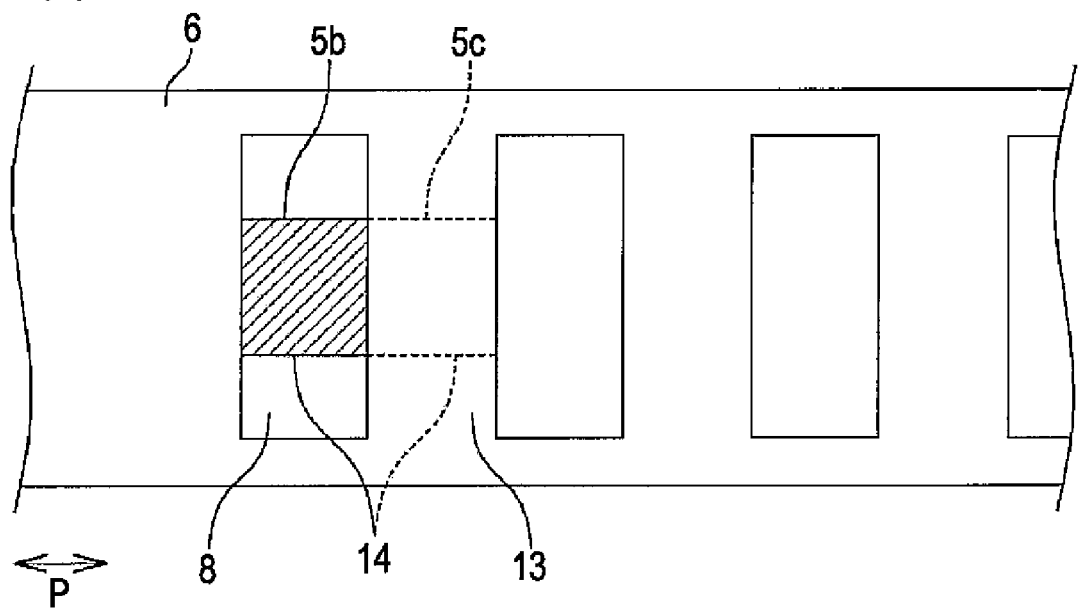
(b)
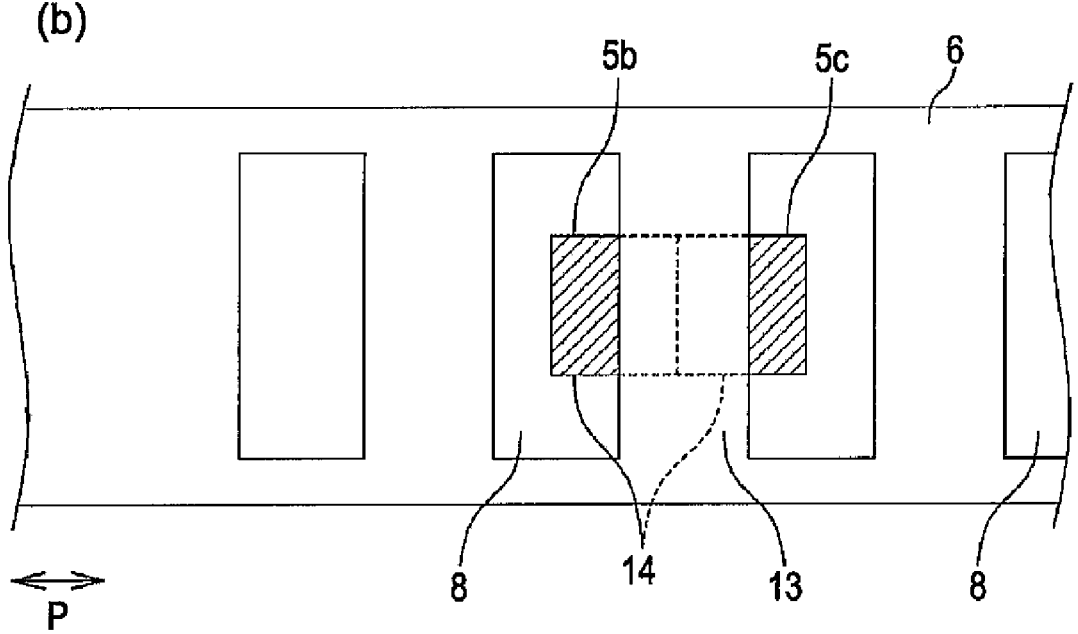

FIG. 14
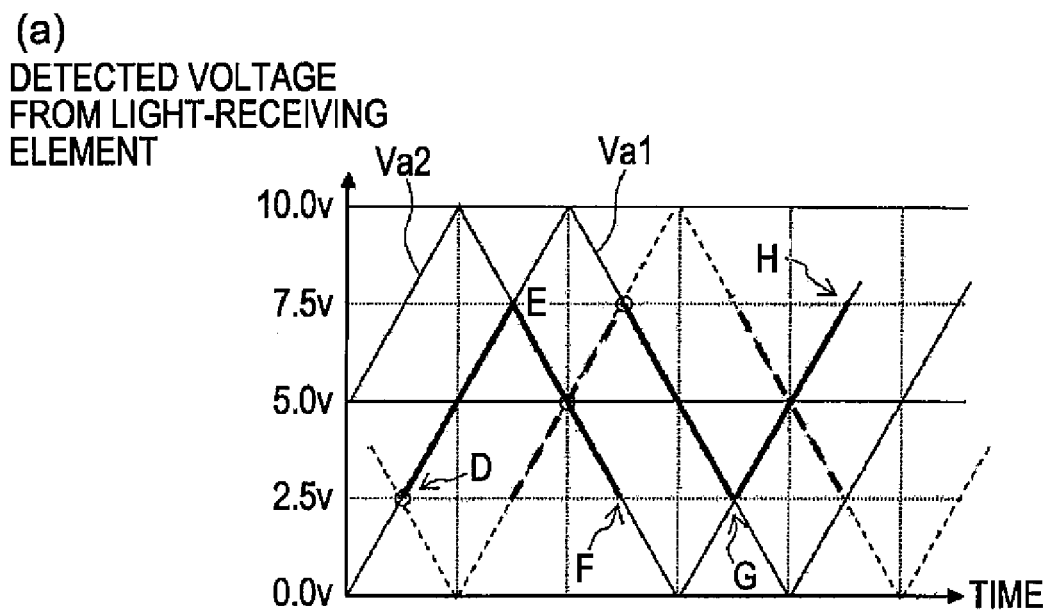
(a) DETECTED VOLTAGE FROM LIGHT-RECEIVING ELEMENT
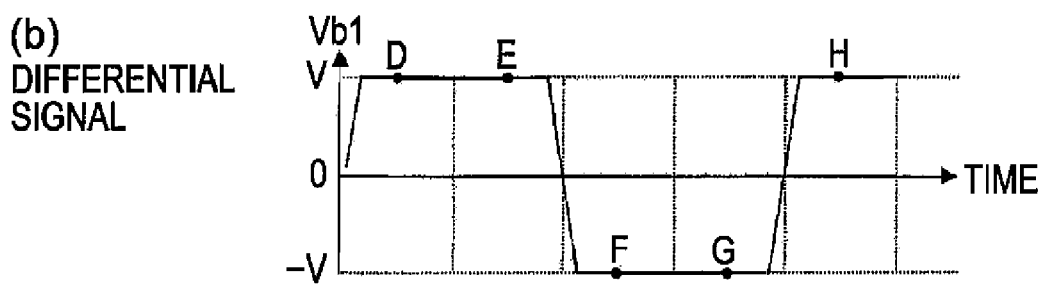
(b) DIFFERENTIAL SIGNAL
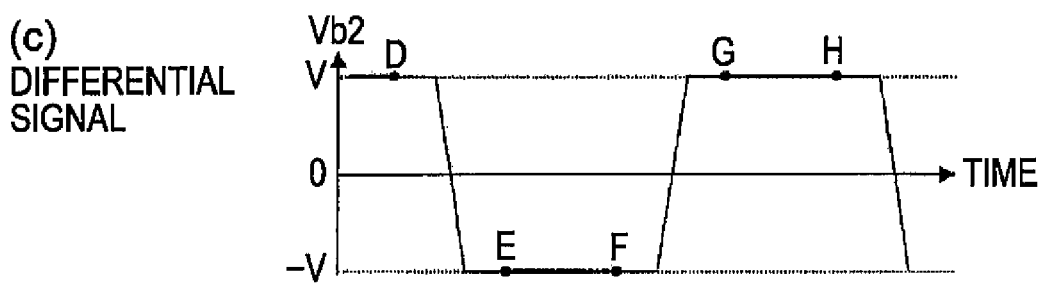
(c) DIFFERENTIAL SIGNAL
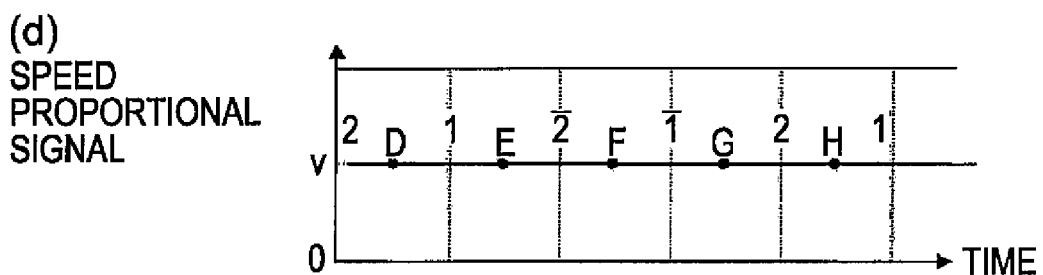
(d) SPEED PROPORTIONAL SIGNAL FIG. 18
(a)
DETECTED VOLTAGE
FROM LIGHT-RECEIVING
ELEMENT
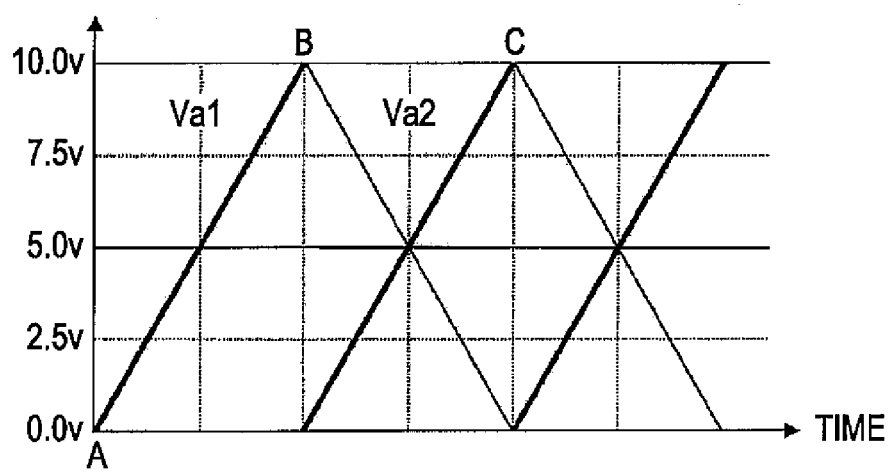
(b)
SPEED PROPORTIONAL
SIGNAL
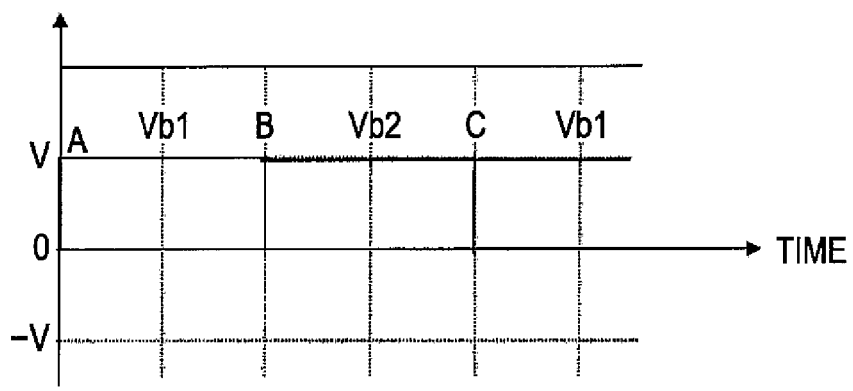

FIG. 22
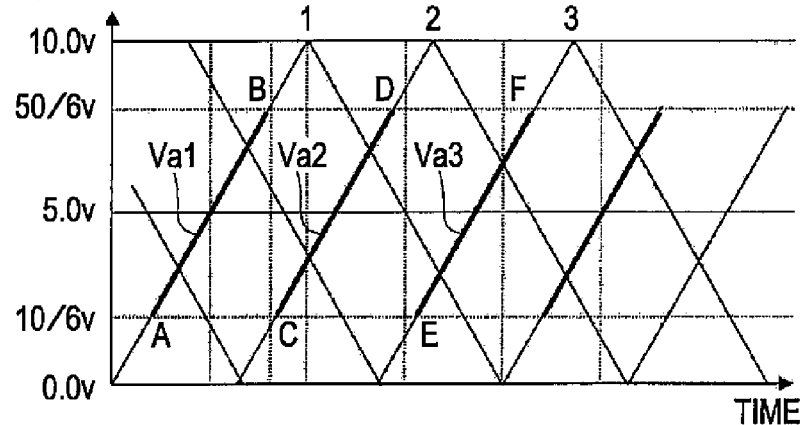
(a) POSITIVE DIRECTION
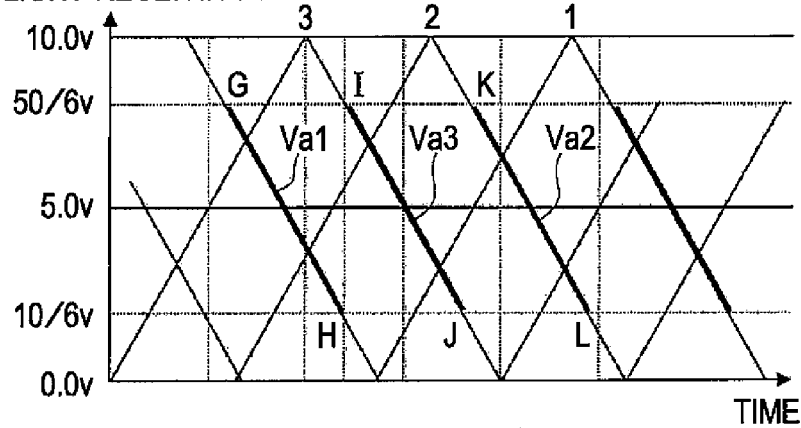
(b) NEGATIVE DIRECTION
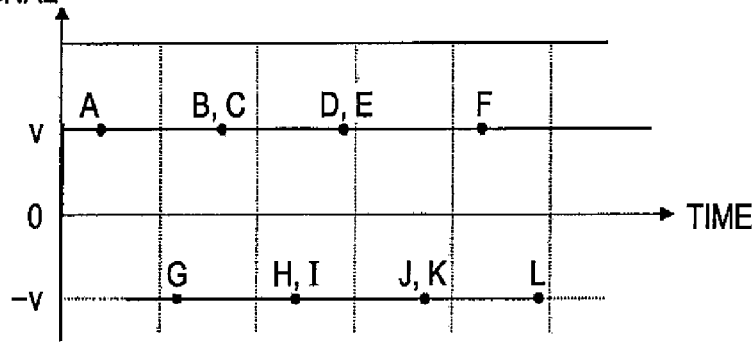
(c)

FIG. 25
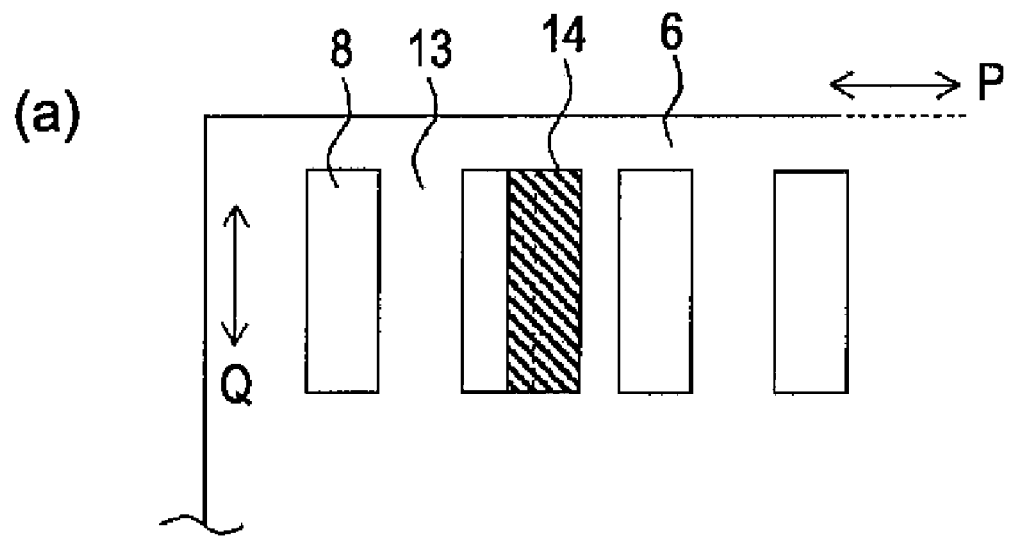
(a)
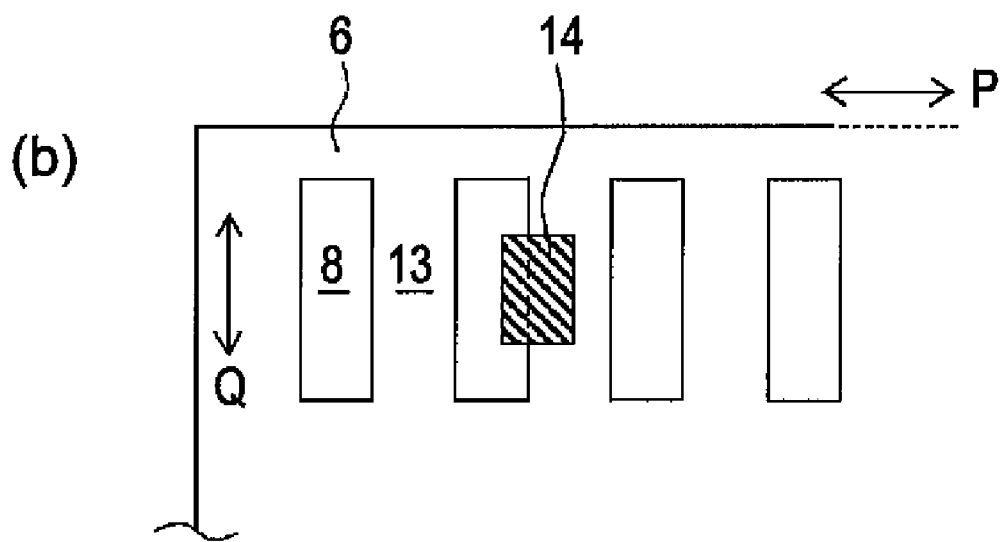
(b)

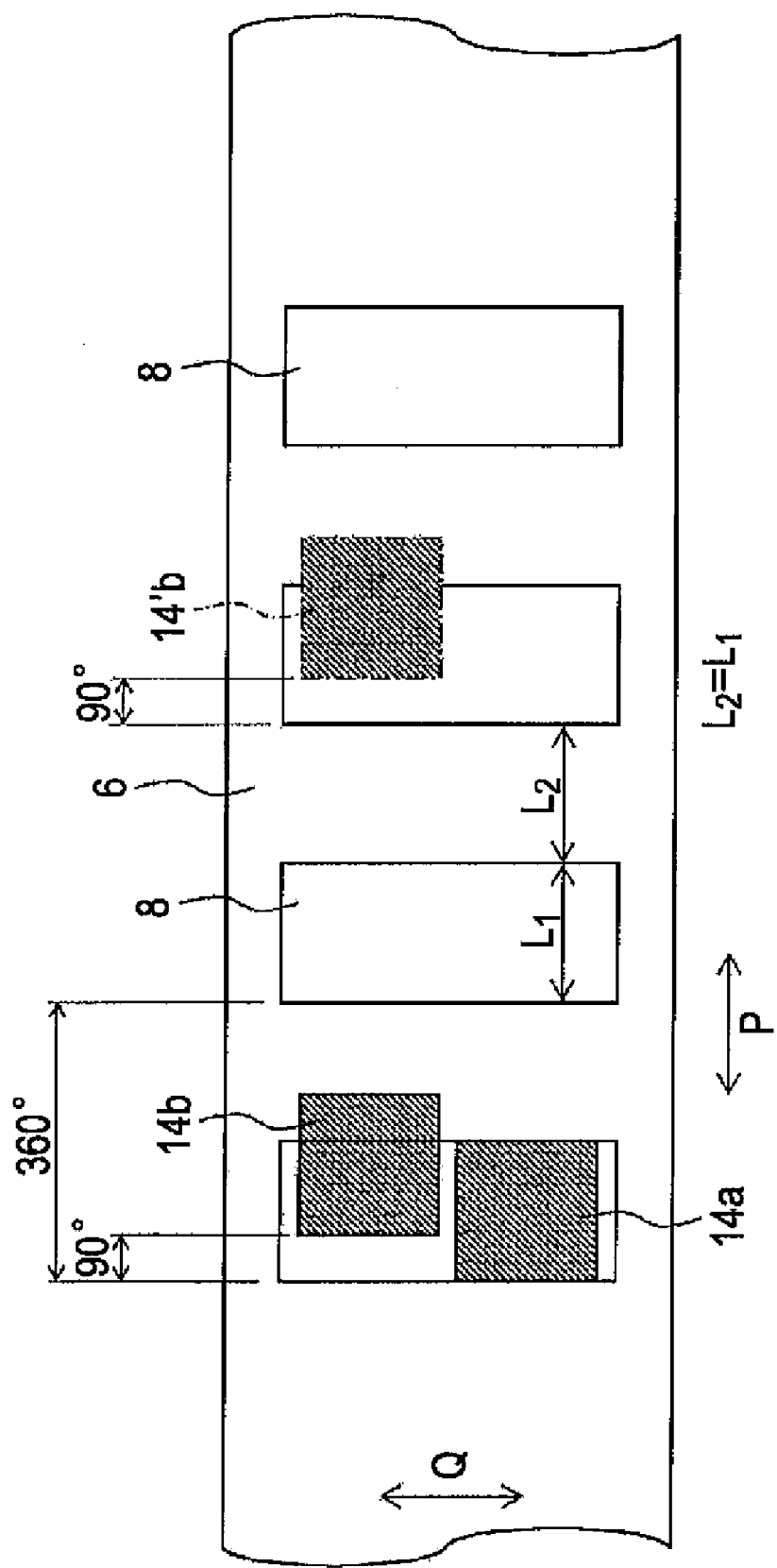

APPARATUS FOR DETECTING SPEED OF MOVABLE BODY AND DRIVE STAGE USING THE SAME

CROSS-REFERENCE TO THE RELATED APPLICATIONS

This application is a national stage of international application No. PCT/JP2005/021701 filed Nov. 25, 2005, the entire contents of which are incorporated by reference. This application also claims benefit of priority under 35 U.S.C. §119 to Japanese Patent Application No. 2005-047456 filed Feb. 23, 2005, the entire contents of which are incorporated by reference.

TECHNICAL FIELD

The present invention relates to the field of detecting the speed of a movable body moving on a stage, and more particularly to a speed detecting apparatus for detecting the speed of a movable body using an ultrasonic motor and optical elements, and a drive stage using the same.

BACKGROUND ART

As means for detecting the position and speed of a movable body, known position/speed detecting apparatuses for detecting the position/speed of a movable body have been available. These devices have a reflection mirror on a stage and use means for calculating a stage position on the basis of the angle of reflection of light output from a light source. An exemplary apparatus is described in Patent Document 1 mentioned below. A laser beam is output from a light source fixed to a position such that a laser beam can be output parallel to the direction in which a movable body moves, and the laser beam is reflected off a reflection mirror disposed on the movable body. The reflected light is allowed to pass through or re-reflected off a half-mirror placed between the light source and the reflection mirror, and this transmissive or reflected light enters a light-receiving element, which measures the amount of the transmissive or reflected light. On the basis of the amount of light, the position and speed of the movable body are calculated.

Patent Document 1: Japanese Unexamined Patent Application Publication No. 9-126720

DISCLOSURE OF INVENTION

Problems to be Solved by the Invention

However, in the method described in the above-mentioned Patent Document 1, light output from the light source is reflected, and the amount of the reflected light is measured, thereby detecting the movement of the movable body.

Therefore, the apparatus includes many components including the reflection mirror, and the structure of the apparatus becomes complicated. It thus takes a great amount of time to do maintenance of the apparatus. Further, a peripheral device is necessary to control the temperature. Since the light is reflected and then the reflected light is directed to enter the light-receiving element, adjustment of the angle of reflection is essential and difficult. Taking into consideration variations in accuracy of the components of the apparatus, it is difficult to adjust the apparatus such that the accurate position and speed of the movable body can be detected.

Means for Solving the Problems

In order to solve the above-described problems, a movable-body-speed-detecting apparatus according to the present invention includes a movable body capable of moving linearly and/or circularly; a plate fixed to the movable body, the plate having a predetermined length in a direction in which the movable body moves; and light emission/reception means arranged such that light output from a light-emitting element enters a light-receiving element. The plate has a window section that passes between the light-emitting element and the light-receiving element in accordance with movement of the movable body and that blocks or allows passage of light to the light-receiving element. The apparatus further includes speed calculation means for calculating the speed of the movable body by converting the amount of light received by the light-receiving element into a signal and measuring the signal.

With this structure, the light-receiving element can detect a light-amount signal in accordance with the overlap with the window section of the moving plate. On the basis of the signal, the speed of the movable body can be calculated. Without a complicated measuring mechanism necessary heretofore, the moving speed of the movable body can be measured using a simple structure. This not only facilitates the maintenance of the apparatus, but also reduces the cost of the overall apparatus including the movable body. Since light emitted from a light source is not reflected, but directed linearly to enter the light-receiving element, the adjustment of the angle of reflection need not be performed, and variations in the amount of incident light become small. As a result, more accurate measurement can be performed.

Preferably, the speed calculation means has a differential section for differentiating a signal corresponding to the amount of light received by the light-receiving element with respect to time, and the speed calculation means calculates the speed of the movable body on the basis of a value of a differential signal obtained by the differential section. With the differentiation, a change in the overlap between an aperture of the light-receiving element and the window section of the moving plate can be detected, and the speed of the movable body can be calculated on the basis of the change.

Suppose that the length of the window section of the plate and the length of the aperture of the light-receiving element are constant in a direction perpendicular to the direction in which the movable body moves, the overlap between the aperture of the light-receiving element and the window section of the moving plate can be converted not into the area, but into the length in the direction in which the movable body moves, which is preferable.

Suppose that light entering the light-receiving element is parallel light, the overlap between the aperture of the light-receiving element and the window section of the moving plate can be accurately detected, which is preferable for accurately measuring the speed.

Provided that an internal edge of the window section of the plate is formed to be substantially parallel to the light entering the light-receiving element, the overlap between the aperture of the light-receiving element and the window section of the moving plate can be even more accurately detected, which is preferable for more accurately measuring the speed.

Provided that the plate includes the window section for receiving light and a blocking section for blocking light from reaching the light-receiving element, the window section and the blocking section being arranged alternately in the direction in which the movable body moves, a plurality of measurements can be made as the movable body moves, and hence the speed can be more accurately measured.

Suppose that the length of the window section in the direction in which the movable body moves is substantially the same as the length of the blocking section in the direction in which the movable body moves, the window section and the blocking section alternately appear on a regular basis. Therefore, in the case where a plurality of light emission/reception means is provided, a continuous speed proportional signal can be easily obtained.

The number of the light emission/reception means provided may be one or at least two. The present invention is application to both cases.

In the case where the number of the light emission/reception means provided is one, it is preferable that an absolute-value generator be provided for obtaining an absolute value of the value of the differential signal obtained by the differential section in order to obtain a continuous speed proportional signal whose sign is not inverted.

In the case where the number of the light emission/reception means provided is two or more, one light emission/reception means is provided to detect a received-light signal on a predetermined continuous period basis, and the other light emission/reception means is provided to detect a signal with a predetermined phase difference from the above-mentioned signal.

For example, in the case where two light emission/reception means are provided, the two light emission/reception means are preferably placed at positions corresponding to a phase difference of 180°. In the case where three light emission/reception means are provided, the three light emission/reception means are preferably placed at positions corresponding to a phase difference of 120°. In general, in the case where n light emission/reception means are provided, the n light emission/reception means are preferably placed at positions corresponding to a phase difference of 360°/n. With this structure, the absolute value and the direction of the speed of the movable body can be detected. In particular, in the case where three or more light emission/reception means are provided, only a signal within an area in which the amount of light received is proportional to the speed of the movable body can be used. Therefore, the accuracy of detection can be improved.

In the case where two light emission/reception means are provided, the two light emission/reception means may be placed at positions corresponding to a phase difference of 90°. In general, in the case where n light emission/reception means are provided, the n light emission/reception means may be placed at positions corresponding to a phase difference of 360°/2n. With this structure, the number of light emission/reception means provided can be reduced by half by having a signal inverter.

Specific examples of the number of light emission/reception means and the phase will be described later in detail in the embodiments of the present invention.

Provided that a second light-receiving element is placed adjacent to the light-receiving element in the direction in which the movable body moves, and the amount of light emitted from the light-emitting element is controlled on the basis of the sum of light-amount detection signals obtained by the light-receiving element and the second light-receiving element, even when the amount of light emitted from the light-emitting element changes, the change can be corrected, whereby the amount of light emitted from the light-emitting element becomes constant at all times. Therefore, the accuracy of detecting the speed can be improved.

Provided that the positional relationship among the light-receiving element, the second light-receiving element, and the blocking section of the plate is set so that the fractional area of one light-receiving element being blocked is equal to the fractional area of the other light-receiving element being open, the amount of light emitted from the light-emitting element can be accurately controlled on the basis of the sum of light-amount detection signals obtained by the light-receiving element and the second light-receiving element.

A movable-body drive stage according to the present invention includes a motor for driving the movable body. On the basis of preset speed information, the motor is controlled so as to control continuous speed information involved in movement of the plate, which is calculated by the speed calculation apparatus.

The above-described and/or further advantages, features, and effects of the present invention will become apparent from the following description of embodiments with reference to the attached drawings.

BRIEF DESCRIPTION OF THE DRAWINGS

FIG. 3($b$) is a sectional view of another shape of an inner-peripheral portion J.

FIG. 6($a$) is a graph plotting the waveform of a signal Va detected by the light-receiving element 5$b$; FIG. 6($b$) is a graph plotting a temporal change in a differential signal Vb obtained by taking the derivative of the voltage waveform; and FIG. 6($c$) is a graph plotting an absolute-value signal Vc of the differential signal.

FIG. 8 includes views of the light-receiving elements 5$b$ and 5$c$ viewed from the light-emitting element 5$a$ side via the plate 6.

FIG. 14($a$) is a graph plotting voltage waveforms Va1 and Va2 of detection signals obtained by light-receiving elements 51$b$ and 52$b$, respectively; FIG. 14($b$) is a graph plotting a differential signal Vb1 obtained by taking the derivative of the voltage waveform Va1; FIG. 14($c$) is a graph showing a differential signal Vb2 obtained by taking the derivative of the voltage waveform Va2; and FIG. 14($d$) is a graph showing a speed proportion signal V that appears continuously.

FIG. 18(a) is a graph plotting the voltage waveforms Va1 and Va2 of the detection signals obtained by the light-receiving elements 51b and 52b, respectively; and FIG. 18(b) is a graph of speed proportional signals V and −V that appear continuously.

FIG. 22(a) is a graph plotting the voltage waveforms Va1, Va2, and Va3 of detection signals obtained by the light-receiving elements 51b, 52b, and 53b, respectively, in the case where a stage 3 moves in one direction; FIG. 22(b) is a graph plotting the voltage waveforms Va1, Va2, and Va3 of the detection signals obtained by the light-receiving elements 51b, 52b, and 53b, respectively, in the case where the stage 3 moves in the opposite direction; and FIG. 22(c) is a graph plotting the speed proportional signals V and −V that appear continuously.

FIG. 25 includes plan views of the relationship between the length of an aperture 14 and the length of window sections 8 in direction Q.

FIG. 26 is a plan view of the positional relationship between an aperture 14a of one light-receiving element and an aperture 14b of a light-receiving element with a phase difference of 90° relative to the former light-receiving element.

REFERENCE NUMERALS

Figure 1:
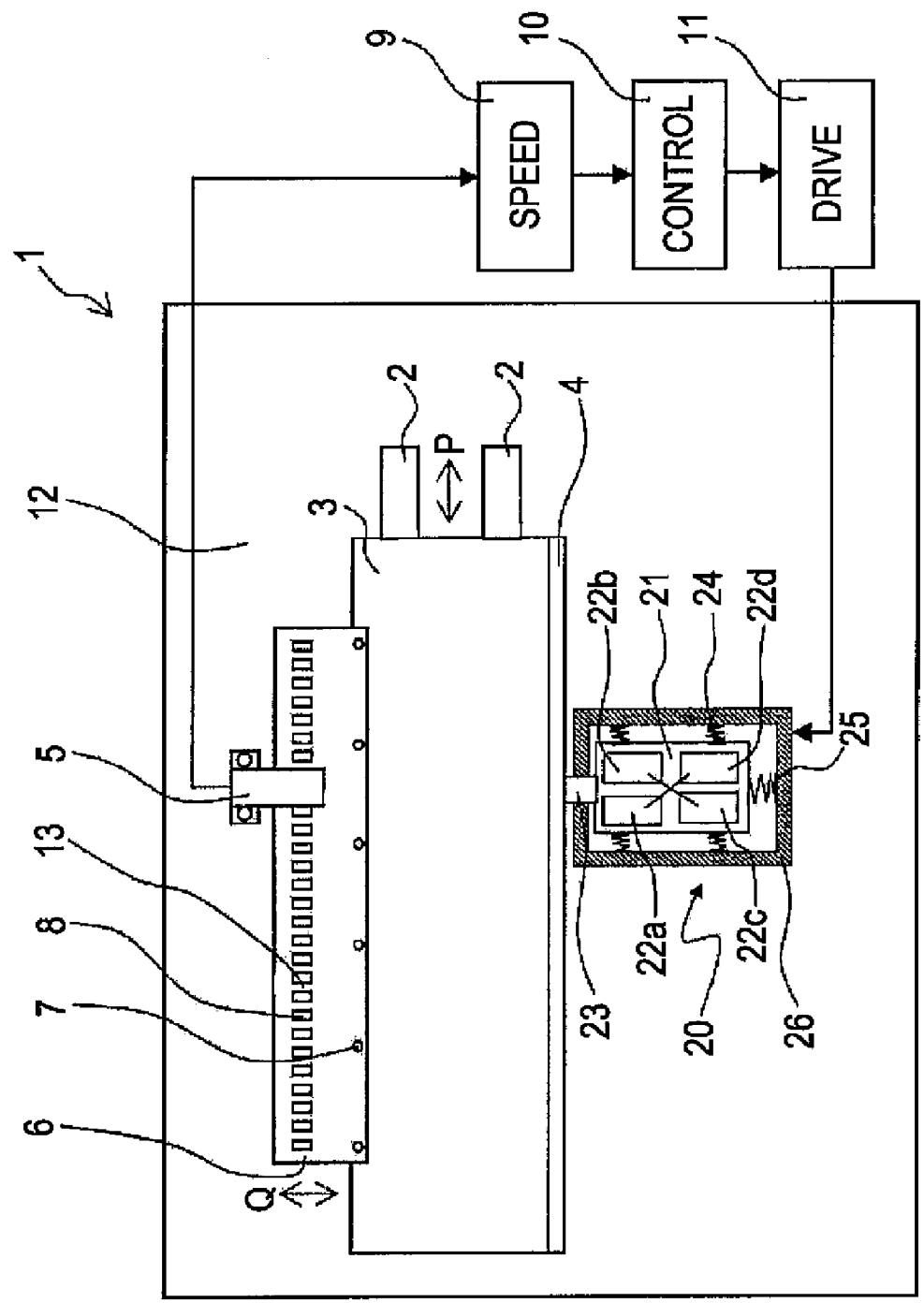
FIG. 1 is a plan view of a drive stage including a speed detecting apparatus according to the present invention.

1: drive stage
2: guide members
3: stage
4: drive-power transfer member
5: optical sensor
5a: light-emitting element
5b: light-receiving element
5c: referential light-receiving element
6: plate
7: fixing screws
8: window sections
9: speed calculating circuit
10: control unit
11: drive unit
12: base board
13: blocking section
14: aperture
20: ultrasonic motor
21: piezoelectric ceramic plate
22a, 22b, 22c, and 22d: thin electrodes
23: friction member
24 and 25: springs
26: casing
30: feedback controller
31: target-value generator
31, 41, 61, 71, 81, 91, 101, and 111: amplifying sections
32, 42, 62, 72, 82, 92, 102, and 112: low-pass filters
33, 43, 63, 73, 83, 93, 103, and 113: differential sections
44, 45, 64, 65, 74, 75, 84, 94, 104, and 114: comparators
34: absolute-value generator
46 and 66: differential-output inverters
51, 52, and 53: optical sensors
51a, 51a, and 53a: light-emitting elements
51b, 51b, 53b: light-receiving elements
60, 80, and 100: switching circuits
111: requested-speed proportional signal
112: instruction signal
113: speed proportional signal
130: feedback controller
131: target-value generator Best Mode for Carrying Out the Invention An embodiment of the present invention will now herein be described in detail below.

FIG. 1 is a plan view of an exemplary drive stage of the present invention.

A drive stage 1 of the present invention includes a pair of guide members 2, such as cross roller guides, on a base board 12. With the guide members 2, a stage 3 serving as a movable body is linearly guided. The direction in which the movable body moves is denoted by "P", and a direction perpendicular to this direction is denoted by "Q".

At one side of the stage 3 (bottom side in FIG. 1), a drive-power transfer member 4 having a planar wall is provided parallel to the moving direction P of the stage 3. A drive source including, for example, an ultrasonic motor 20 is disposed at a position facing the drive-power transfer member 4. The ultrasonic motor 20 includes a friction member 23 which is vertically in contact with a butting surface of the drive-power transfer member 4 and transfers the drive-power transfer member 4 in the moving direction P by elliptic movement thereof.

A known electromagnetic motor or the like is also applicable as the drive source. However, compared with other drive sources, the ultrasonic motor 20 can perform accurate transfer and positioning and is small. Thus, the drive stage 1 can be designed to be compact, and the maintainability of the drive stage 1 becomes satisfactory. From these advantages, it is preferable that the ultrasonic motor 20 be used as the drive source.

A plate 6 is fixed by fixing means, such as fixing screws 7 or the like, to the other side of the stage 3 (top side in FIG. 1). Further, an optical sensor 5 including light-receiving and -emitting elements is disposed on the base board 12. An output of the optical sensor 5 is connected to a speed calculating circuit 9. The plate 6, the optical sensor 5 and the speed calculating circuit 9 function as a "speed detecting apparatus".

In addition, a control unit 10 for generating an instruction signal on the basis of a speed proportional signal from the speed calculating circuit 9 is provided. The control unit 10 outputs an instruction signal to a drive unit 11, thereby driving the ultrasonic motor 20 to move the stage 3 along the guide members 2. In such a manner, the control unit 10 serves as a servo controller, such as a PD controller or the like.

Figure 2:
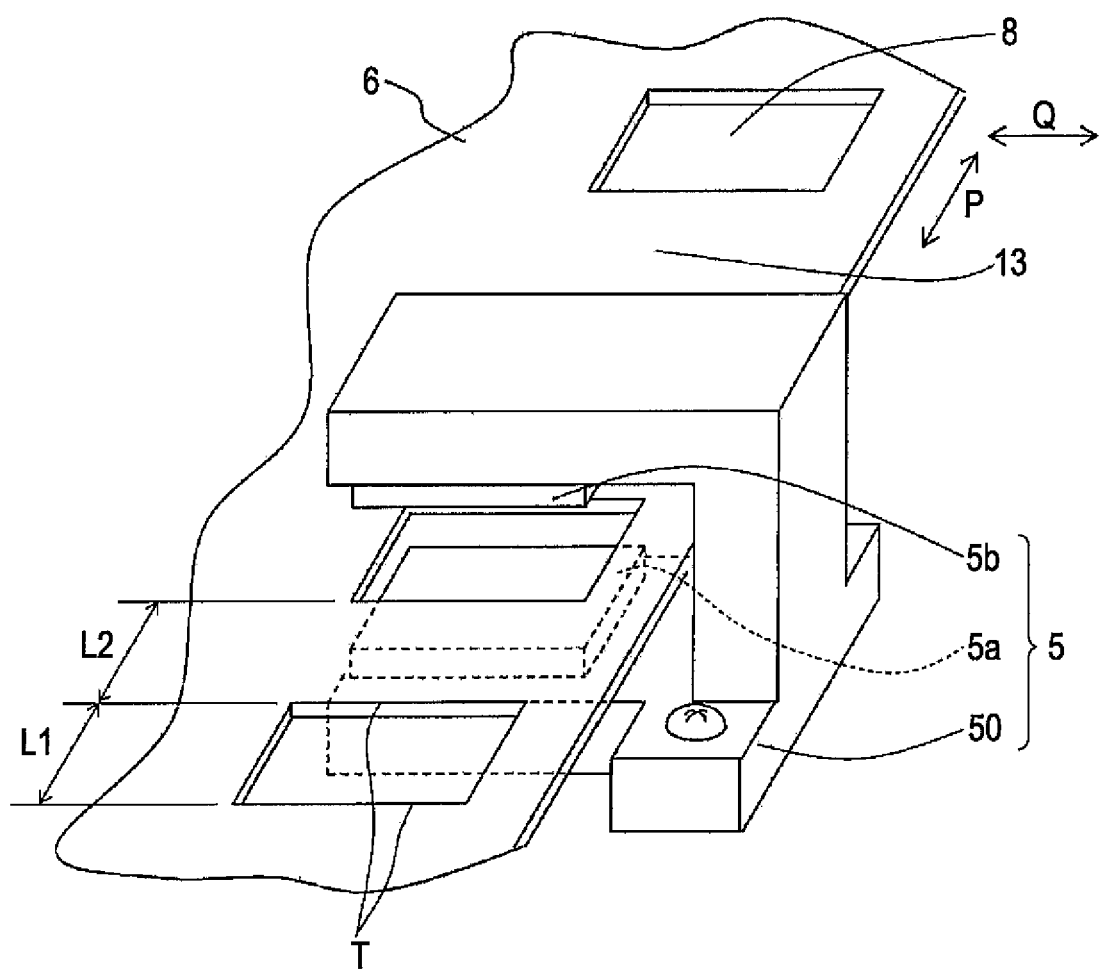
FIG. 2 is an enlarged perspective view of the speed detecting apparatus.
Figure 3:
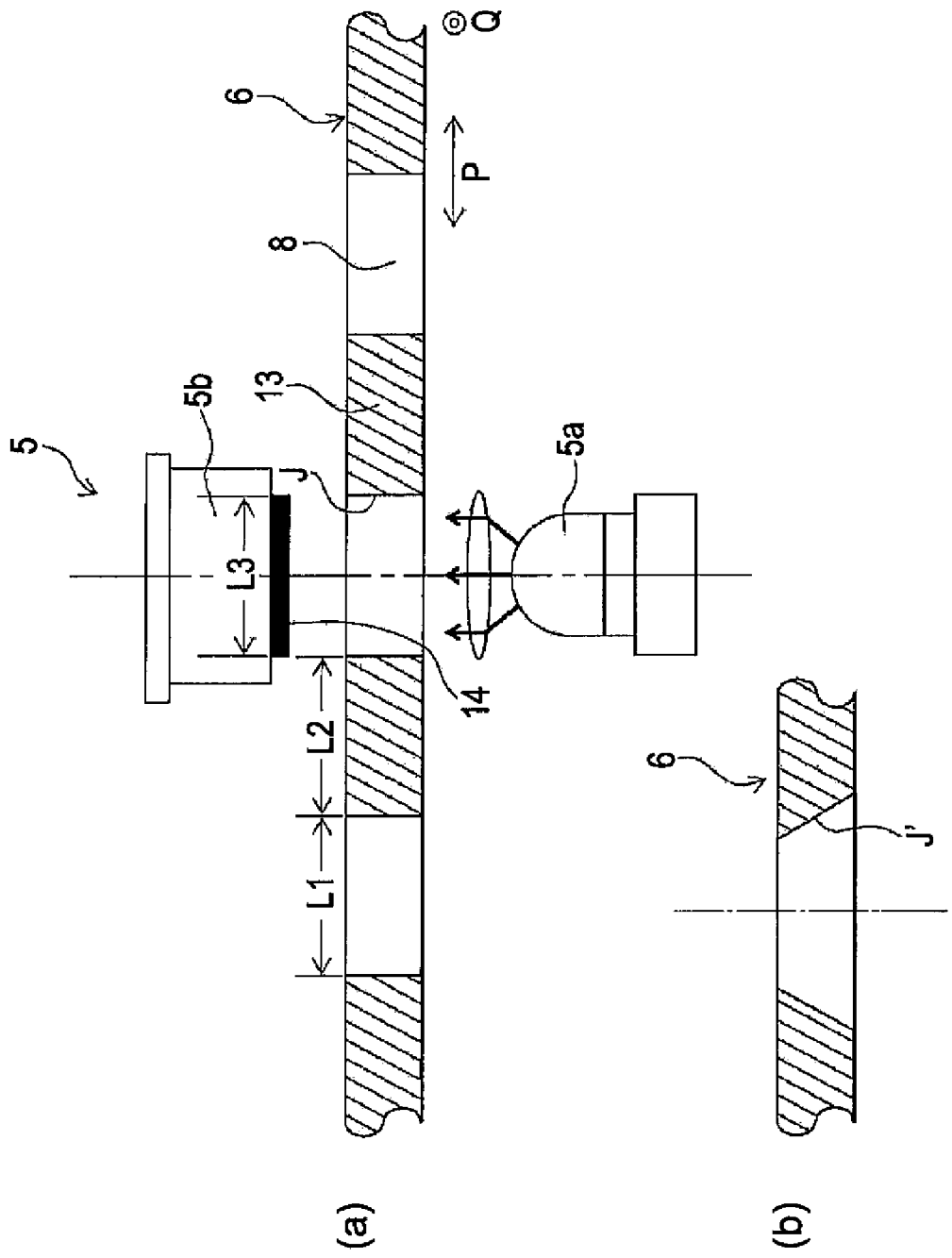
FIG. 3($a$) is a sectional view of the is positional relationship among a light-emitting element 5$a$, a light-receiving element 5$b$, and a plate 6.

FIG. 2 is an enlarged perspective view of the speed detecting apparatus. FIG. 3(a) is a sectional view of the positional relationship among a light-emitting element 5a, a light-receiving element 5b, and the plate 6.

The light-emitting element 5a and the light-receiving element 5b of the optical sensor 5 are provided to face each other such that light emitted from the light-emitting element 5a can be directed to be incident on the light-receiving element 5b. The light-emitting element 5a and the light-receiving element 5b are disposed on a support 50 having a "U" shape, for example, as shown in the drawing, whereby the positional accuracy thereof can be ensured.

Commercially-available elements can be used as the light-emitting element 5a and the light-receiving element 5b. For example, an infrared LED or the like may be used as the light-emitting element 5a, and a photo diode or a photo transistor may be used as the light-receiving element 5b.

The light-receiving element 5b has an aperture 14 of a predetermined size. Light is detected through the aperture 14, and a signal in proportion to the amount of the detected light is output. The aperture 14 can be of any shape, such as circular, triangular, or the like. It is more preferable that the aperture 14 be shaped substantially quadrilateral.

The length of the aperture 14 of the light-receiving element 5b in the moving direction P of the stage 3 is denoted by L3 (see FIG. 3(a)). In the case where the aperture 14 has a quadrilateral shape, it is preferable that the length L3 in the moving direction P of the movable body be constant in the direction Q perpendicular to the moving direction P of the movable body.

It is also preferable that light incident on the light-receiving element 5b be parallel light. If the light is not parallel light, the light cannot be received by the entire area corresponding to the aperture 14 of the light-receiving element 5b. The amount of light is reduced by the amount of light that has not been received through the aperture 14 of the light-receiving element 5b, and hence the accurate speed of the stage 3 cannot be detected. It is therefore preferable to use, as the light-emitting element 5a, a single LED combined with a lens whose angle has been adjusted so as to convert light into parallel light on the basis of the wavelength of the light. Accordingly, light emitted from the light source can be converted into parallel light. Note that the lens may be contained in the LED. In that case, an external lens need not be attached to the LED.

The material of the support 50 may be, for example, ceramics, metal, resin, or the like. As long as the light-emitting element 5a and the light-receiving element 5b can be attached to the support 50, any material can be used. From the viewpoint of cost effectiveness, it is preferable to use the support 50 made of metal.

The plate 6 includes a plurality of window sections 8 arranged at predetermined intervals in the moving direction P of the stage 3 and blocking sections 13 covering the remaining area, as shown in FIG. 2 and FIG. 3(a).

Each of the window sections 8 has edges that are perpendicular to the moving direction P of the stage 3. These edges are indicated by "T" in FIG. 2. The length of the window sections 8 in the moving direction P of the movable body is represented by a distance L1 between this pair of edges T facing each other. It is preferable that the distance L1 be constant in the direction Q perpendicular to the moving direction P of the window section 8. Further, the length of the blocking sections 13 in the moving direction P of the stage 3 is denoted by L2. The length L2 is the distance between the closest edges T of the adjacent window sections 8.

It is more preferable that L1 and L2 be substantially the same. In that case, the window sections 8 and the blocking sections 13 can have a repeating structure at a predetermined cycle. Accordingly, the concept of "phase" in which one cycle corresponds to 360° can be introduced.

In order not to reflect light emitted from the light-emitting element 5a at an inner-peripheral portion J in the thickness direction of the window section 8, as shown in FIG. 3(b), an inner-peripheral portion J' of the plate 6 is sloped to make the blocking sections thinner (see FIG. 3(b)). The inner-peripheral portion J' is sloped in order to prevent light emitted from the light-emitting element 5a from being reflected off the inner-peripheral portion J' to enter the light-receiving element 5b. In addition to or instead of the sloping, it is preferable that the inner-peripheral portion J be stained with a color that is less likely to reflect light. For example, a black or gray stain is thinly applied to the surface, or a colored material is used to form the plate 6. Various methods can be used to apply tone.

In the case where light emitted from the light-emitting element 5a is parallel light, it is preferable that the plate 6 be formed so that the inner-peripheral portion J in the thickness direction of the window section 8 is substantially parallel to the direction of the light (see FIG. 3(a)). In the case where the inner-peripheral portion J in the thickness direction of the window section 8 is substantially parallel to the direction of the light, it is less likely that the amount of light passing through each window section 8 of the plate 6 and entering the aperture 14 of the light-receiving element 5b would differ from one window section 8 to another window section 8, and the more accurate speed of the stage 3 can be calculated.

The plate 6 passes between the light-emitting element 5a and the light-receiving element 5b of the optical sensor 5 in accordance with the movement of the stage 3, and light emitted from the light-emitting element 5a to the light-receiving element 5b is allowed to pass through each window section 8 to be received or blocked by each blocking section 13.

With this movement, the amount of light entering the aperture 14 of the light-receiving element 5b changes with time, and a signal output from the light-receiving element 5b in proportion to the amount of light entering the aperture 14 fluctuates. The signal is converted into a voltage, current, or resistance output from the light-receiving element, and the value fluctuates depending on the amount of the light received.

The speed calculating circuit 9 amplifies the signal and measures the signal, thereby calculating the speed of the plate 6. Since the plate 6 is fixed to the stage 3, once the speed has been obtained, this speed is the same as the speed of the stage 3. In contrast to a known structure, the speed of the stage 3 can be easily calculated without providing a complicated measuring mechanism.

The plate 6 has the multiple window sections 8. In the case where the moving distance of the stage 3 is extremely short, such as a few millimeters, only one window section 8 need be formed. The number of window sections 8 provided varies according to the moving distance of the stage 3.

Next, a speed-measuring method performed by the speed detecting apparatus will be described in detail.

Light emitted from the light-emitting element 5a enters the light-receiving element 5b via one window section 8, except for a portion blocked by the blocking section 13 of the plate 6. In this case, the amount of light received by the light-receiving element 5b is proportional to the area of an overlapping portion of the aperture 14 of the light-receiving element 5b and the window section 8. As the stage 3 moves, the plate 6 moves with the movement of blocking section and window section. As a result, the area of the overlapping portion of the aperture 14 and each window section 8 changes, so does the amount of light received by the light-receiving element 5b. This change in amount of light per unit time corresponds to the speed of the stage 3, based on which the speed of the stage 3 can be determined. By further taking the derivative of the determined speed, the acceleration of the stage 3 can also be obtained.

Figure 4:
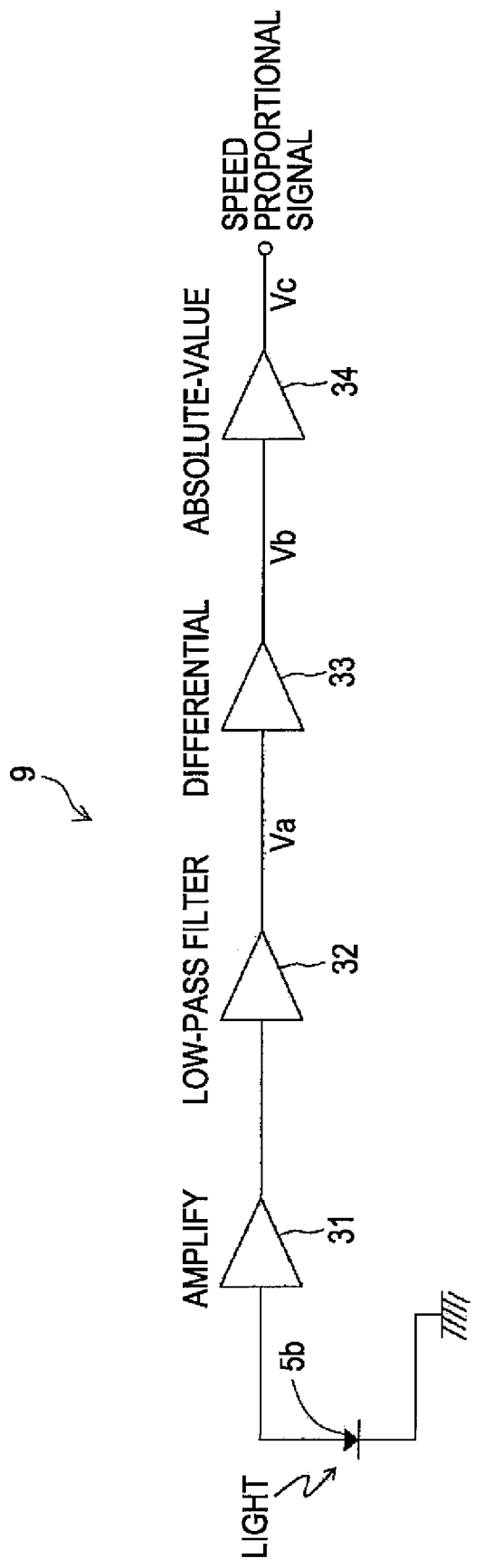
FIG. 4 is a circuit block diagram of a speed calculating circuit 9.
Figure 5:
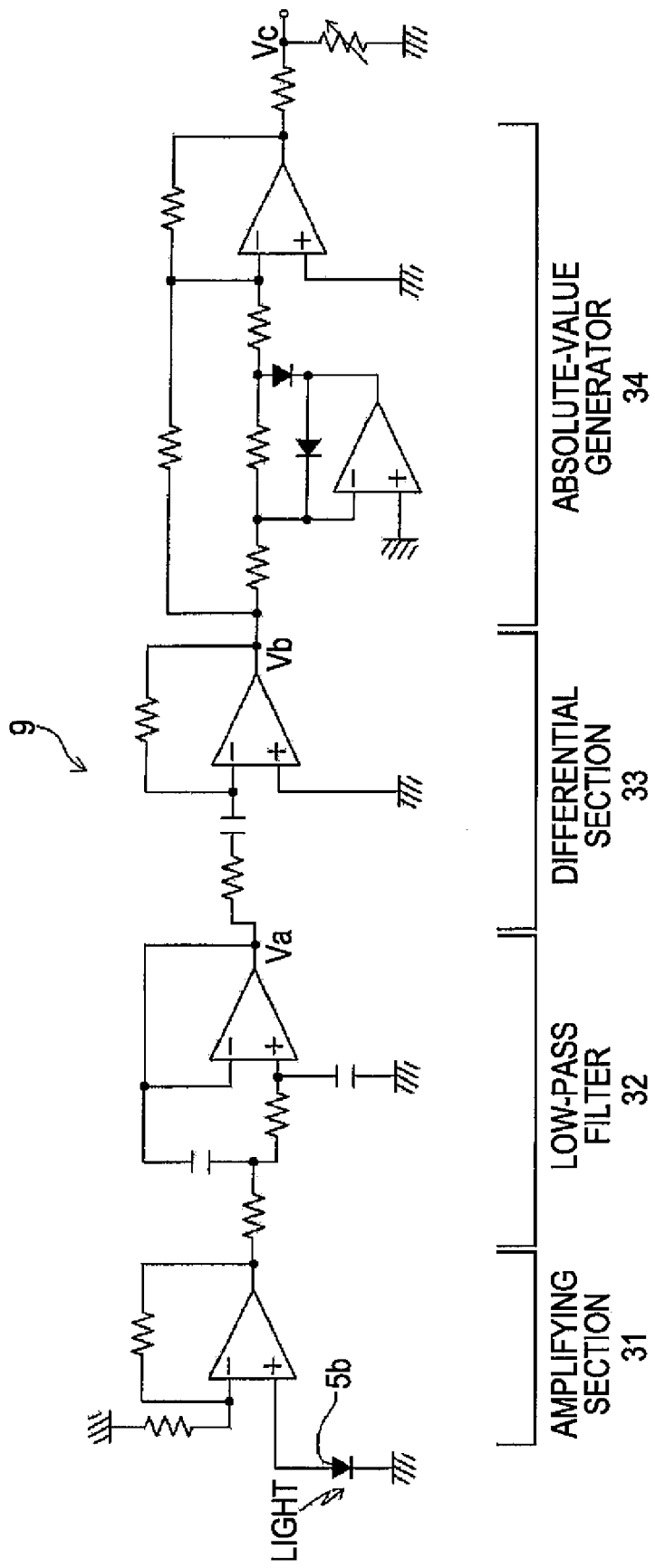
FIG. 5 is a specific circuit diagram of the speed calculating circuit 9 implemented by an operational amplifier.

FIG. 4 is a circuit block diagram of the speed calculating circuit 9. FIG. 5 is a specific circuit diagram of the speed calculating circuit 9 implemented by an operational amplifier.

Using this circuit, the flow of a signal will be described. A light detection signal obtained by the light-receiving element 5b is amplified by an amplifying section 31 by a predetermined magnification factor. The amplified signal passes through a low-pass filter 32, whereby small changes such as noise on the signal waveform are removed. If there is less noise, the low-pass filter may be omitted. This signal is denoted by "Va". Thereafter, the signal Va is differentiated by a differential section 33. The differentiated signal is denoted by "Vb". Further, an absolute-value generator 34 inverts a negative portion of the signal to positive.

The above functions of the speed calculating circuit 9 may be implemented by the operational amplifier, as shown in FIG. 5. Alternatively, the functions may be implemented by software operation using a microcomputer.

An output signal Vc of the speed calculating circuit 9 is sent to the control unit 10. The control unit 10 outputs an instruction signal in accordance with a change in speed of the stage 3 to the drive unit 11, thereby controlling the stage 3.

Next, FIG. 6(a) is a graph plotting the waveform of the signal Va detected by the light-receiving element 5b. In the graph, the voltage value detected by the light-receiving element 5b is plotted on the ordinate, and time on the abscissa.

The light-receiving element 5b outputs zero voltage in the case where no light is incident on the aperture 14, which is indicated by position A in FIG. 6(a). That is, light emitted from the light-emitting element 5a is completely blocked by one blocking section 13 of the plate 6. As the stage 3 starts moving, the plate 6 moves, and light emitted from the light-emitting element 5a that has been completely blocked by the blocking section 13 starts to enter the light-receiving element 5b via one window section 8. At position B in FIG. 6(a), half of the length L3 of the aperture 14 of the light-receiving element 5b overlaps half of the length L1 of the window section 8. In this state, the light-receiving element 5b outputs a voltage (5V) half the output voltage (e.g., 10V) in the case where light is received by the entire area corresponding to the aperture 14. At position C in FIG. 6(a), the window section 8 of the plate 6 coincides with the aperture 14 of the light-receiving element 5b, whereby light is incident on the entirety of the aperture 14. The light-receiving element 5b detects the maximum output voltage (10V). Thereafter, the plate 6 starts to perform blocking-movement, and the amount of light entering the light-receiving element 5b via the window section 8 becomes smaller.

FIG. 6(b) is a graph plotting a temporal change in a differential signal Vb obtained by taking the derivative of the above-mentioned voltage waveform by the differential section 33. FIG. 6(c) is a graph plotting an absolute-value signal Vc obtained by conversion of the differential signal by the absolute-value generator 34.

This absolute-value signal Vc corresponds to the "speed proportional signal". The relationship between the value of the speed proportional signal and the actual speed of the stage 3 can be obtained by obtaining and plotting the values of speed proportional signals while moving the stage 3 at various known speeds and by statistically processing this relationship using least-squares analysis or the like. If only a rough value is necessary, this can be calculated on the basis of the relationship between the length L3 of the aperture 14 and the voltage Vc.

Since the differential signal Vb takes positive and negative values, the speed of the stage 3 cannot be obtained on the basis of the differential signal Vb. Thus, the absolute value of the differential signal is obtained, and a continuous speed proportional signal whose sign is not inverted is obtained. By measuring the value of the absolute-value signal Vc, the speed of the stage 3 can be obtained. There is a portion Z in which the value of the absolute-value signal Vc decreases to zero. This corresponds to a portion where the value of the differential signal Vb changes from positive to negative or from negative to positive (referred to as zero-cross). The longer the existing time of the portion Z, the more the errors in detection of the speed of the stage 3. Since the existing time of the portion Z is negligibly short with respect to the entire time, it is regarded that the portion Z will not cause an error in detection of the speed of the stage 3.

In the above-described manner, the speed of the stage 3 can be detected on the basis of the value of the absolute-value signal Vc.

In an embodiment described later, the portion Z is eliminated by having multiple optical sensors 5.

The structure of the ultrasonic motor 20 included in the drive unit will be described. As shown in an example of FIG. 1, the ultrasonic motor 20 has thin electrodes 22a, 22b, 22c, and 22d, which are four sections disposed on a main surface of a piezoelectric ceramic plate 21. The diagonally placed thin electrode 22a and thin electrode 22d are connected to each other. The diagonally-adjacent thin electrode 22b and thin electrode 22d are connected to each other. A thin electrode (not shown) is formed on the substantial entirety of the other main surface. The friction member 23, which is formed of ceramics or glass, is provided on an end face of the piezoelectric ceramic plate 21. The piezoelectric ceramic plate 21 is fixed by springs 24 to a casing 26. A spring 25 disposed perpendicular to the drive-power transfer member 4 presses the piezoelectric ceramic plate 21 against the drive-power transfer member 4 via the friction member 23.

The thin electrode (not shown) formed on one main surface is grounded, and voltages with different phases are applied to the thin electrode 22a and the thin electrode 22b formed on the other main surface, thereby generating longitudinal vibrations and transverse vibrations on the piezoelectric ceramic plate 21. By combining these vibrations, the friction member 23 is moved along an elliptical path.

Ceramics or glass is used to form the friction member 23 of the ultrasonic motor 20. The use of generally used ceramics, such as alumina, exhibits satisfactory driving characteristics. In particular, in the case where the friction member 23 is formed of a composite material including alumina and titanium carbide, satisfactory driving characteristics are exhibited, compared with the friction member 23 formed of a material, such as alumina, that has been used heretofore. Further, in the case where the drive-power transfer member 4 disposed on the stage 3 is also formed of a ceramics material, more satisfactory driving characteristics can be achieved.

Next, an embodiment in which the amount of light emitted from the light-emitting element 5a is controlled using a referential light-receiving element 5c in addition to the light-receiving element 5b will be described.

As the light-emitting element 5a is used, the amount of light emitted from the light-emitting element 5a changes due to the aging of the light-emitting element 5a. Also, the amount of light emitted from the light-emitting element 5a is influenced by ambient temperature at the time of use or the power supply voltage. It is thus preferable to control and maintain, as needed, the amount of light emitted from the light-emitting element 5a constant at all times.

The following light-amount correcting circuit is adopted in this embodiment.

FIGS. 7(a) and 7(b) are cross-sections showing the positional relationship among the light-emitting element 5a, the light-receiving elements 5b and 5c, and the plate 6.

FIGS. 8(a) and 8(b) show the state in which the light-receiving elements 5b and 5c are viewed from the light-emitting element 5a side via the plate 6.

In these views, besides the light-receiving element 5b, the referential light-receiving element 5c is disposed adjacent to the light-receiving element 5b in the moving direction P of the plate 6.

The light-receiving element 5b and the light-receiving element 5c are disposed at positions at which the light-receiving elements 5b and 5c receive the same amount of light from the light-emitting element 5a if no plate 6 exists. The light-receiving elements 5b and 5c need to have the same light-receiving characteristic (voltage generated according to the amount of light). If the light-receiving elements 5b and 5c have different light-receiving characteristics, minor adjustment of the difference is made by performing gain control of amplifying sections 140 and 141.

The positional relationship among the light-receiving elements 5b and 5b and one blocking section 13 is such that the fractional area of one light-receiving element being blocked is equal to the fractional area of the other light-receiving element being open.

With this arrangement, it is regarded that the length L1 of the window sections 8 is equal to the length L2 of the blocking sections 13, and the length L3 of the aperture 14 of the light-receiving element 5b is equal to the length L4 of the aperture 14 of the light-receiving element 5c. In addition, it is regarded that the length L1 of the window sections 8 is equal to the length L3 of the aperture 14 of the light-receiving element 5b.

Therefore, as shown in FIG. 7(a) and FIG. 8(a), in the case where the position of the aperture 14 of the light-receiving element 5b completely coincides with the position of one window section 8 and the light-receiving element 5b receives the maximum amount of light from the light-emitting element 5a through the window section 8, the light-receiving element 5c cannot receive light from the light-emitting element 5a because of one blocking section 13. As shown in FIG. 7(b) and FIG. 8(b), in the case where half of the position of the aperture 14 of the light-receiving element 5b coincides with half of the position of one window section 8, half of the position of the light-receiving element 5c coincides with half of the position of another window section 8, and hence, one half of the light emitted form the light-emitting element 5a can be received by the light-receiving element 5b, and the other half of the light can be received by the light-receiving element 5c. It thus can be regarded that the sum of the light received by the light-receiving element 5b and the light received by the light-receiving element 5c corresponds to the amount of light emitted from the light-emitting element 5a.

In this embodiment, the light-receiving element 5b is used to detect the position, as has been done. The amount of light received by the light-receiving element 5b and the amount of light received by the light-receiving element 5c are added to yield the sum, which is used to control the amount of light emitted from the light-emitting element 5a.

Figure 9:
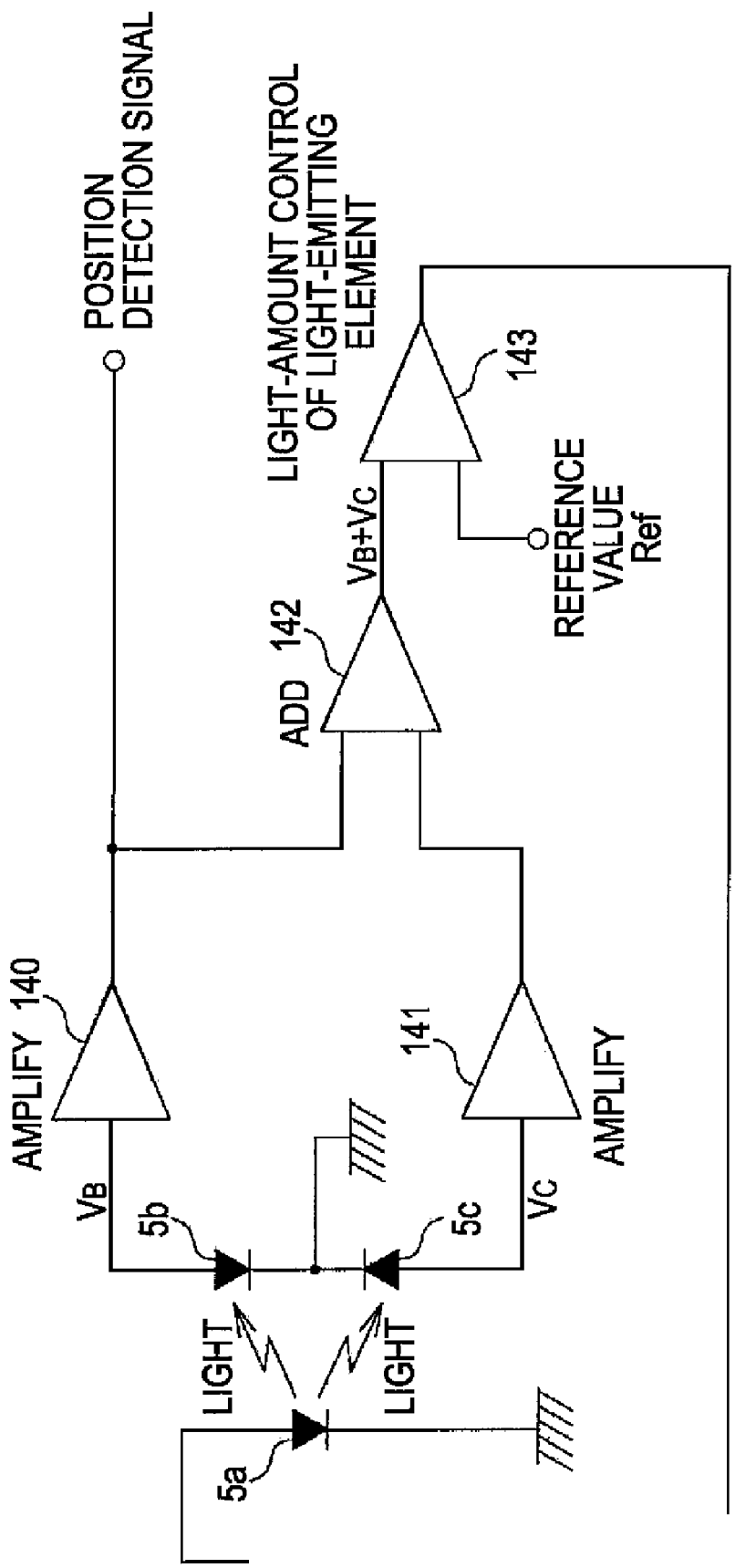
FIG. 9 is a block diagram of a light-amount control circuit for the light-emitting element 5$a$.

To this end, a light-amount control circuit shown in FIG. 9 is adopted. This detection circuit includes the amplifying section 140 for amplifying the light detected by the light-receiving element 5b and the amplifying section 141 for amplifying the light detected by the light-receiving element 5c. Output voltages of the amplifying sections 140 and 141 are added by an adder circuit 142, and the sum signal is compared by a comparator 143 with a reference value Ref. When the sum signal is greater than the reference value Ref, light-amount correction is done so as to reduce the amount of light emitted from the light-emitting element 5a. When the sum signal is smaller than the reference value Ref, light-amount correction is done so as to increase the amount of light emitted from the light-emitting element 5a.

The reason that the amount of light emitted from the light-emitting element 5a can be corrected on the basis of the sum signal of the amount of light received by the light-receiving element 5b and the amount of light received by the light-receiving element 5c is as follows. Let VB be an output voltage of the light-receiving element 5b and VC be an output voltage of the light-receiving element 5c, and the output voltage VB of the light-receiving element 5b and the output voltage VC of the light-receiving element 5c are such that, in the case where one light-receiving element is blocked to output zero voltage, the other light-receiving element outputs the maximum voltage, and vice versa. In the case where one light-receiving element is blocked halfway, the other light-receiving element is also blocked halfway. On the basis of such a relationship, the voltage VB+VC indicating the sum of the amounts of light received by the two light-receiving elements is always constant, irrespective of the position of the plate 6. The value VB+VC can be regarded to indicate the amount of light emitted from the light-emitting element 5a. By controlling the amount of light emitted from the light-emitting element 5a using VB+VC, the amount of light emitted from the light-emitting element 5a can be kept at constant at all times.

Although the light-receiving element 5b and the light-receiving element 5c are adjacent to each other without any gap therebetween in the arrangement shown in FIG. 7(a), the light-receiving element 5b and the light-receiving element 5c may be disposed with a gap therebetween, as shown in FIG. 7(c). The length L3 of the aperture 14 of the light-receiving element 5b may be shorter than the length L1 of the window sections 8. The length L4 of the aperture 14 of the light-receiving element 5c may be shorter than the length L3 of the blocking section 13.

Alternatively, the light-receiving element 5b and the light-receiving element 5c may be disposed so as to be shifted from each other in the direction Q perpendicular to the moving direction P of the movable body.

The description of the speed detecting apparatus according to the present invention has been made. The above description concerns the case in which the optical sensor 5 including a pair of the light-emitting element 5a and the light-receiving element 5b is mounted. In the case where the distance moved by the stage 3 becomes longer, it is preferable to use two or more sensors to detect the speed of the stage 3.

The following description concerns a speed detecting apparatus and a drive stage according to the present invention in which two or more sensors are used.

Figure 10:
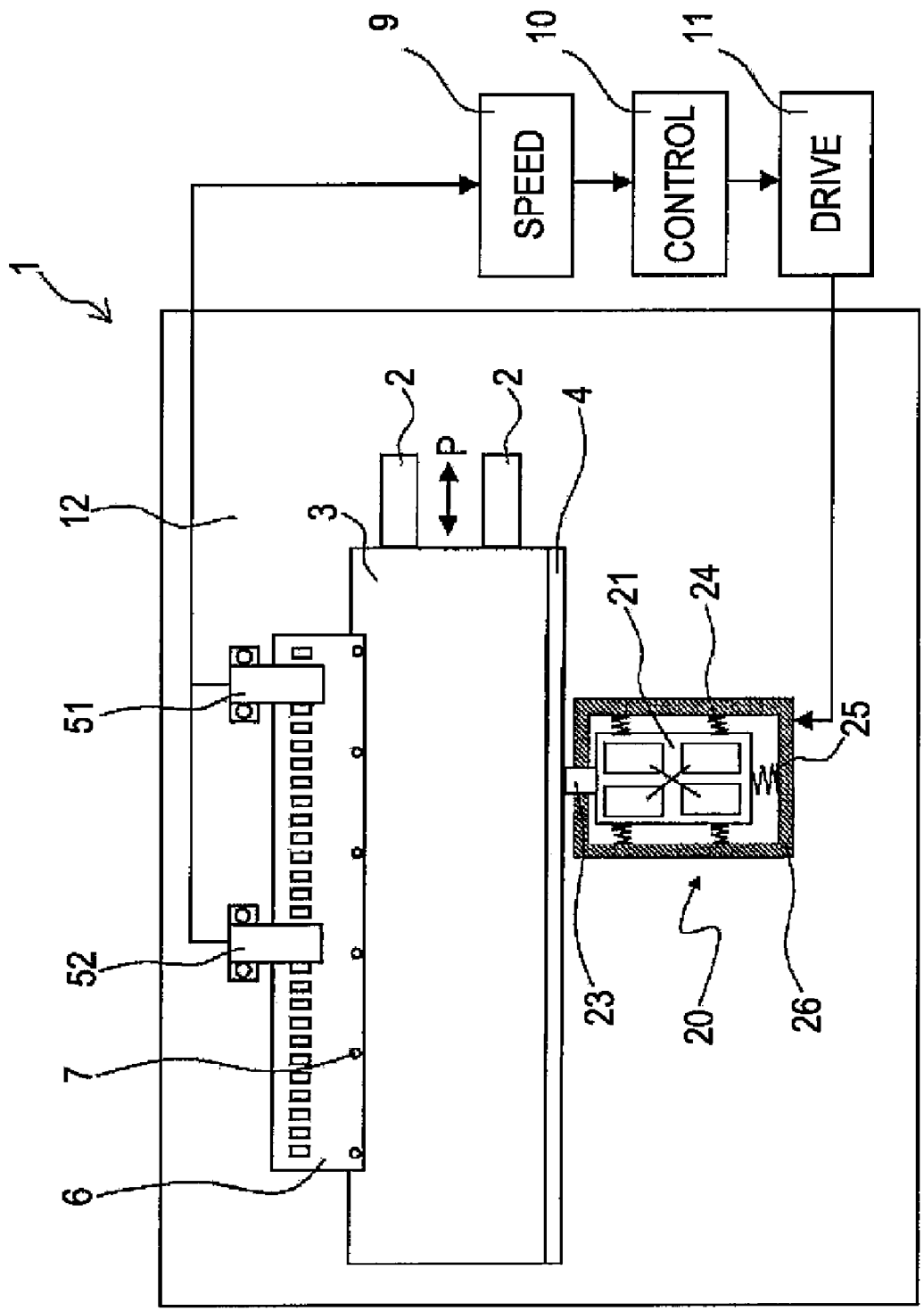
FIG. 10 is a schematic plan view of the drive stage according to the present invention, on which two optical sensors 51 and 52 are disposed at positions corresponding to a phase difference of 90 degrees.

FIG. 10 is a schematic diagram of the drive stage according to the present invention, on which two optical sensors 51 and 52 are disposed. The components excluding the arrangement of the optical sensors 51 and 52 and the structure of the speed calculating circuit 9 are similar to the above-described case in which one optical sensor 5 is disposed, and descriptions thereof are thus omitted.

Figure 11:
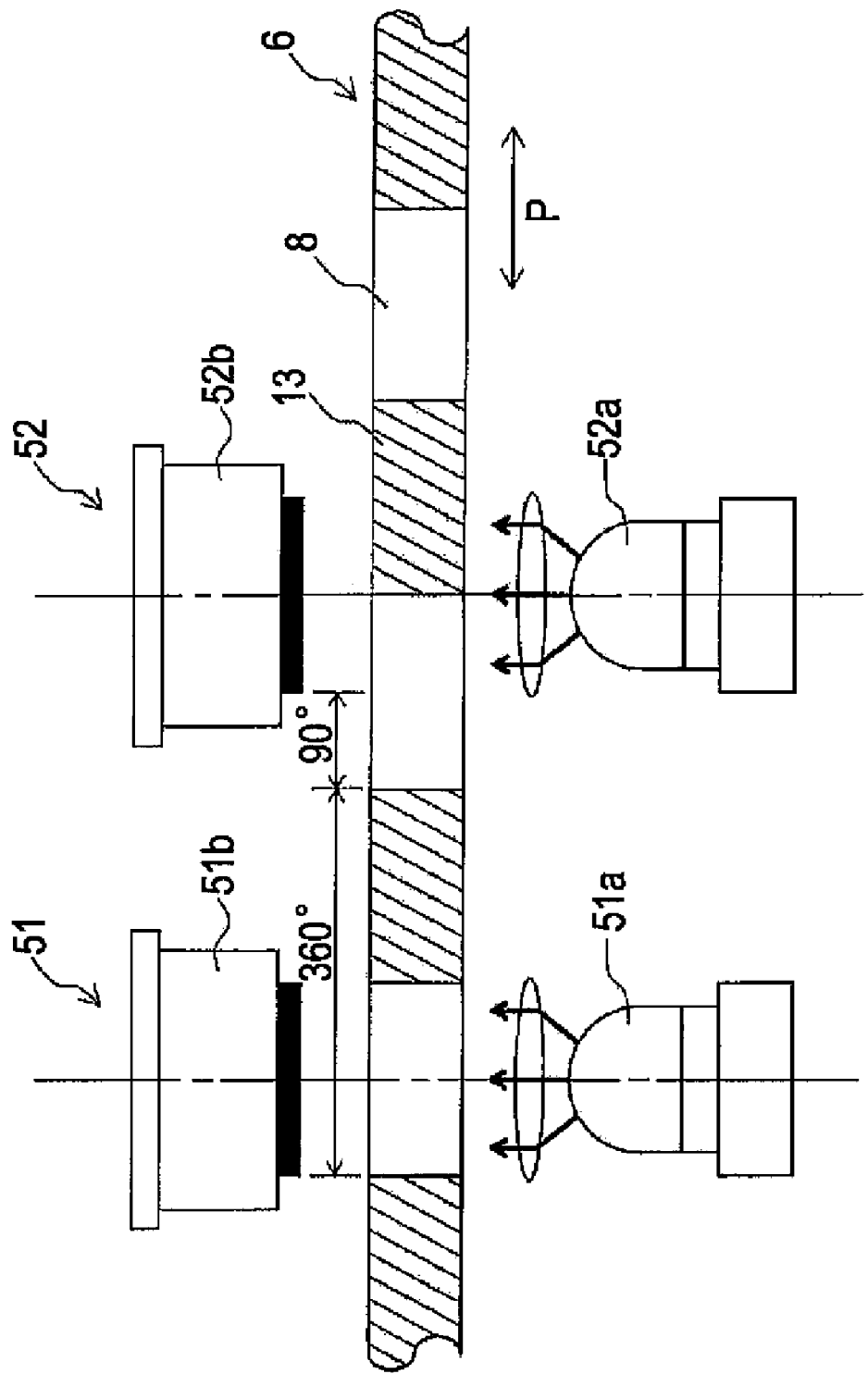
FIG. 11 is a sectional view of a state in which, relative to the position at which the optical sensor 51 is disposed, the other optical sensor 52 is disposed at a position corresponding to a phase difference of 90 degrees.

In the case where two sensors are disposed, as shown in FIG. 11, with respect to the position at which the optical sensor 51 including a light-receiving element 51b is disposed, the other optical sensor 52 is disposed at a position at which a voltage detected by a light-receiving element 52b is out of phase by 90 degrees. In contrast to a speed detecting apparatus including one optical sensor 51 in which the speed proportional signal becomes zero at a position at which one window section 8 of the plate 6 completely coincides with the aperture 14 of the light-receiving element 5b and at a position at which the aperture 14 of the light-receiving element 5b is completely blocked by one blocking section 13, this can be compensated for using the other optical sensor 52. That is, the speed proportional signal obtained from the other optical sensor 52 does not become zero at the time at which the speed proportional signal obtained on the basis of the optical sensor 51 is zero. Thus, one of these two signals can be selected, and hence more fine control can be implemented.

Figure 12:
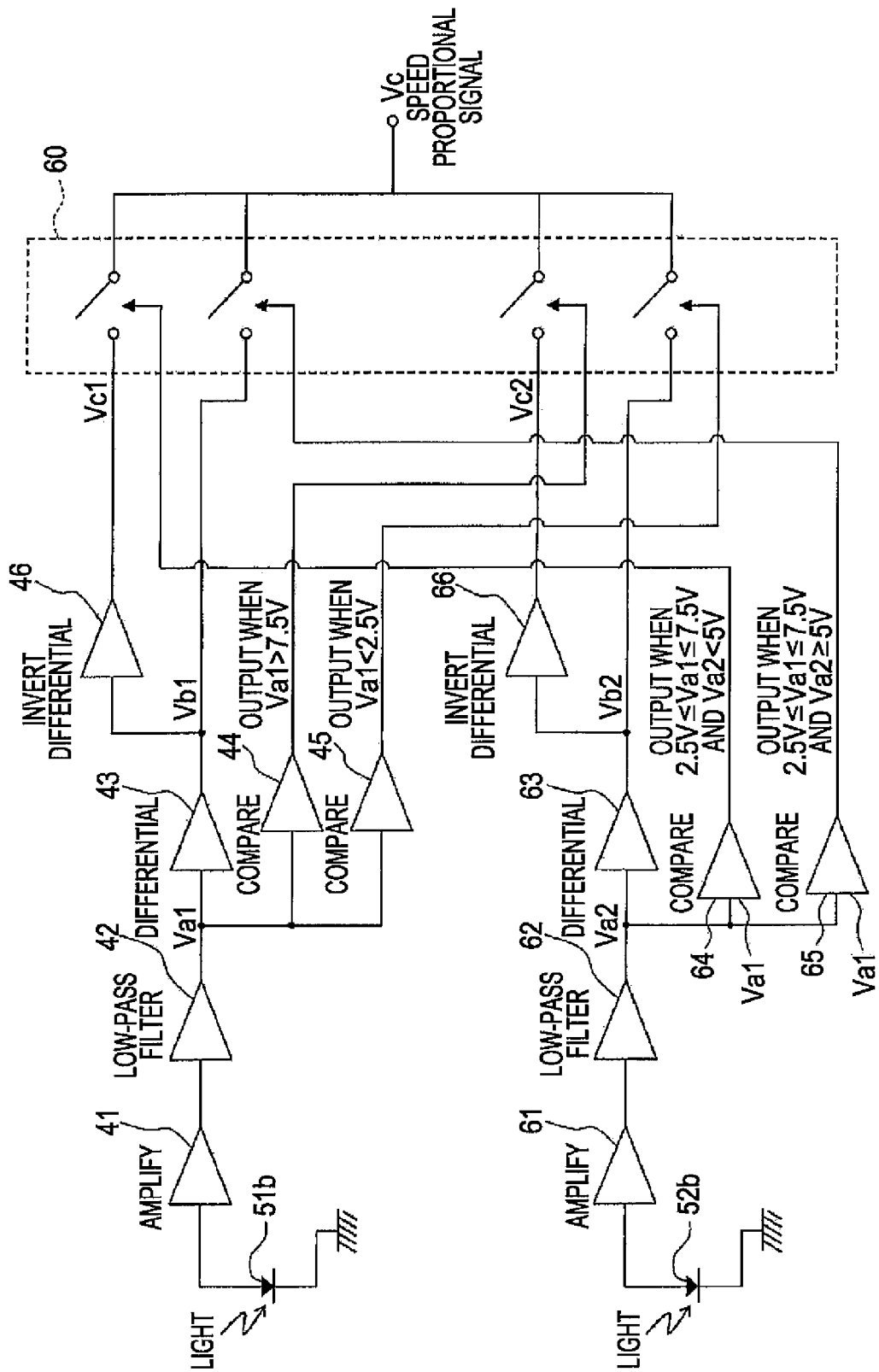
FIG. 12 is a circuit block diagram of the speed calculating circuit 9.
Figure 13:
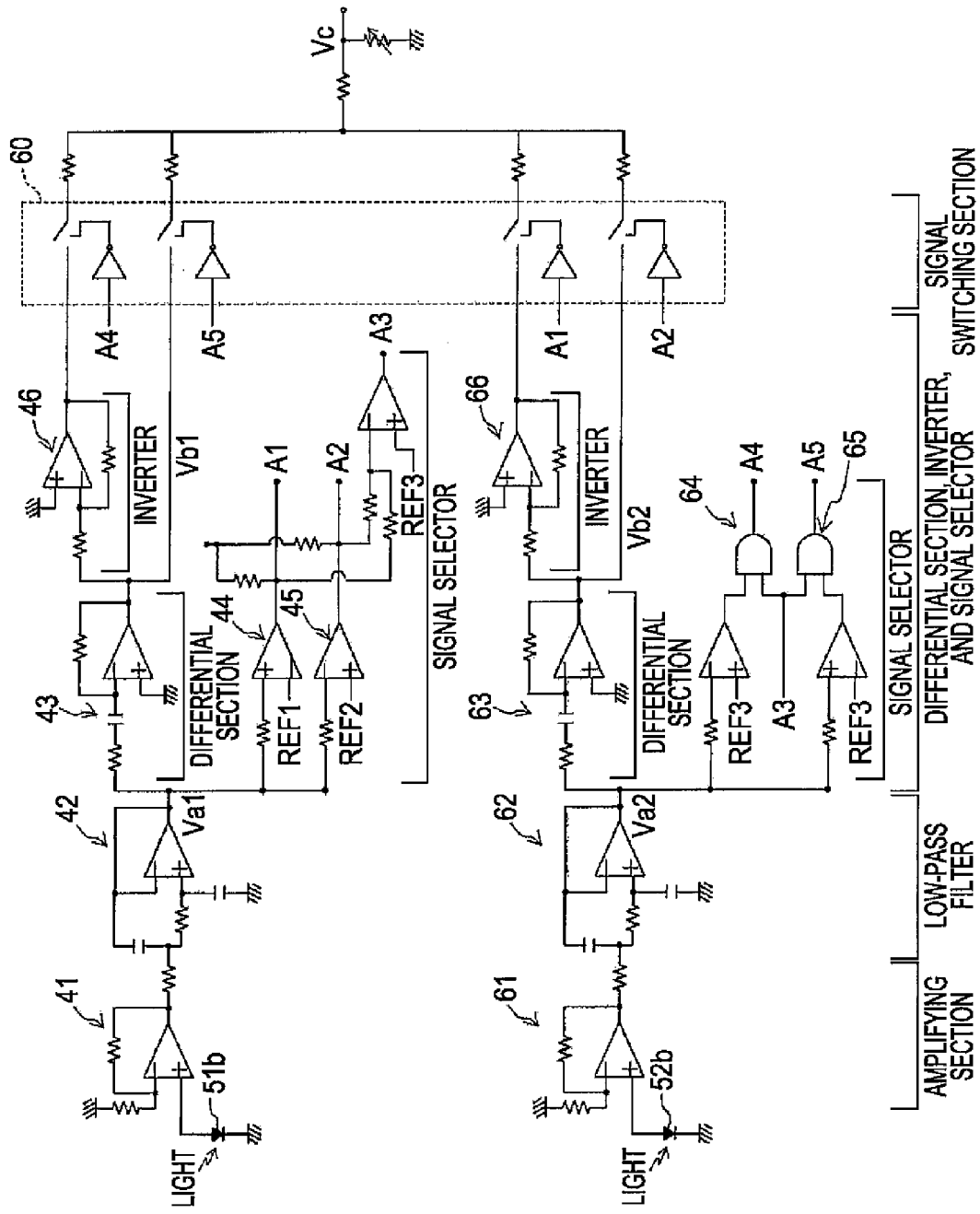
FIG. 13 is a specific circuit diagram of the speed calculating circuit 9 implemented by an operational amplifier.

FIG. 12 is a circuit block diagram of the speed calculating circuit 9. FIG. 13 is a specific circuit diagram of the speed calculating circuit 9 implemented by an operational amplifier.

Using this circuit, the flow of a signal will be described. A light detection signal obtained by the light-receiving element 51b is amplified by an amplifying section 41 by a predetermined magnification factor. The amplified signal passes through a low-pass filter 42, whereby small changes such as noise on the signal waveform are removed. This signal is denoted by "Va1". Thereafter, the signal Va1 passes through a differential section 43 and is differentiated with respect to time. The differentiated signal is denoted by "Vb1". Further, a differential-output inverter 46 inverts the positive/negative of the signal waveform. An output signal of the differential-output inverter 46 is denoted by "Vc1". The signal Va1 is compared by a comparator 44 with a threshold of 7.5 V and is compared by a comparator 45 with a threshold of 2.5 V.

The reason the two thresholds are used will be described. A voltage detected by the light-receiving element 5b is 10 V in full scale, where 7.5 V is the upper one-quarter value and 2.5 V is the lower one-quarter value. The area between the upper one-quarter value and the lower one-quarter value can be regarded to be in a range in which the amount of light received is proportional to speed. Therefore, two thresholds are set in order to switch between the signal Va1 and the signal Va2.

In contrast, a light detection signal obtained by the light-receiving element 52b is amplified by an amplifying section 61 by a predetermined magnification factor. The amplified signal passes through a low-pass filter 62. This signal is denoted by "Va2". Thereafter, the signal Va2 is differentiated by a differential section 63. The differentiated signal is denoted by "Vb2". Further, a differential-output inverter 66 inverts the positive/negative of the signal waveform. An output signal of the differential-output inverter 66 is denoted by "Vc2". A comparator 64 compares the signal Va1 with a threshold of 2.5 V and a threshold of 7.5 V, and compares the signal Va2 with a threshold of 5 V. A comparator 65 compares the signal Va1 with a threshold of 2.5 V and a threshold of 7.5 V, and compares the signal Va2 with a threshold of 5 V.

The speed calculating circuit 9 further includes a switching circuit 60 for selecting and outputting one of the output signal Vc1 of the differential-output inverter 46, the differential signal Vb1 of the differential section 43, the output signal Vc2 of the differential-output inverter 66, and the differential signal Vb2 of the differential section 63.

FIG. 14(a) is a graph plotting the voltage waveforms Va1 and Va2 of the detection signals obtained by the light-receiving elements 51b and 52b, respectively. It is clear from the graph that the voltage waveform Va1 changes in such a manner that the phase of the voltage waveform Va1 lags behind that of the voltage waveform Va2 by 90°.

Positions D, E, F, G, and H shown in FIG. 14 indicate points at which the signal is switched at the corresponding thresholds 2.5 V and 7.5 V.

The voltage waveform Va1 is differentiated to yield the differential signal Vb1 shown in FIG. 14(b). The voltage waveform Va2 is differentiated to yield the differential signal Vb2 shown in FIG. 14(c).

The operation of the comparators 44, 45, 64, and 65 will be described.

The comparator 44 controls the switching of the switching circuit 60 so that the output signal Vc2 of the differential-output inverter 66, that is, the inverted signal of the differential signal Vb2 of the differential section 63, can be output in a period where the detection signal Va1 of the light-receiving element 51b exceeds the threshold 7.5 V, that is, in a period from the signal switching point E to the signal switching point F. Accordingly, as shown in FIG. 14(d), a speed proportional signal is obtained in a period from the signal switching point E to the signal switching point F.

The comparator 45 controls the switching of the switching circuit 60 so that the differential signal Vb2 of the differential section 63 can be output in a period where the detection signal Va1 of the light-receiving element 51b falls below the threshold 2.5 V, that is, in a period from the signal switching point a to the signal switching point H. Accordingly, as shown in FIG. 14(d), a speed proportional signal is obtained in a period from the signal switching point G to the signal switching point H.

The comparator 64 controls the switching of the switching circuit 60 so that the output signal Vc1 of the differential-output inverter 46, that is, the inverted signal of the differential signal Vb1 of the differential section 43, can be output in a period where the detection signal Va1 of the light-receiving element 51b is between the thresholds 2.5 V and 7.5 V and the detection signal Va2 of the light-receiving element 52b is less than the threshold 5V, for example, in a period from the signal switching point F to the signal switching point G. Accordingly, as shown in FIG. 14(d), a speed proportional signal is obtained in a period from the signal switching point F to the signal switching point G.

The comparator 65 controls the switching of the switching circuit 60 so that the differential signal Vb1 of the differential section 43 can be output in a period where the detection signal Va1 of the light-receiving element 51b is between the thresholds 2.5 V and 7.5 V and the detection signal Va2 of the light-receiving element 52b is greater than or equal to the threshold 5 V, for example, in a period from the signal switching point D to the signal switching point E. Accordingly, as shown in FIG. 14(d), a speed proportional signal is obtained in a period from the signal switching point D to the signal switching point E.

With the above-described operation, the differential signal Vb1 or the inverted signal Vc1 thereof can be obtained in a period where the value of the signal is stable, excluding the period where the differential signal Vb1 of the differential section 43 crosses zero. The differential signal Vb2 or the inverted signal Vc2 thereof can be obtained in a period where the value of the signal is stable, excluding the period where the differential signal Vb2 of the differential section 63 crosses zero.

Accordingly, the speed proportional signal sent to the control unit 10 can be continuous, whereby the drive unit 11 can be controlled more accurately. Since the differential-output inverters are included, the number of light-receiving and -emitting elements provided is advantageously reduced by half.

Although the number of optical sensors provided is two in the above example, more optical sensors may be arranged. In general, in the case where n optical sensors are arranged, the n optical sensors are placed at intervals of 360°/2n. The number of blocks of the speed calculating circuit corresponds to the number of optical sensors.

Figure 15:
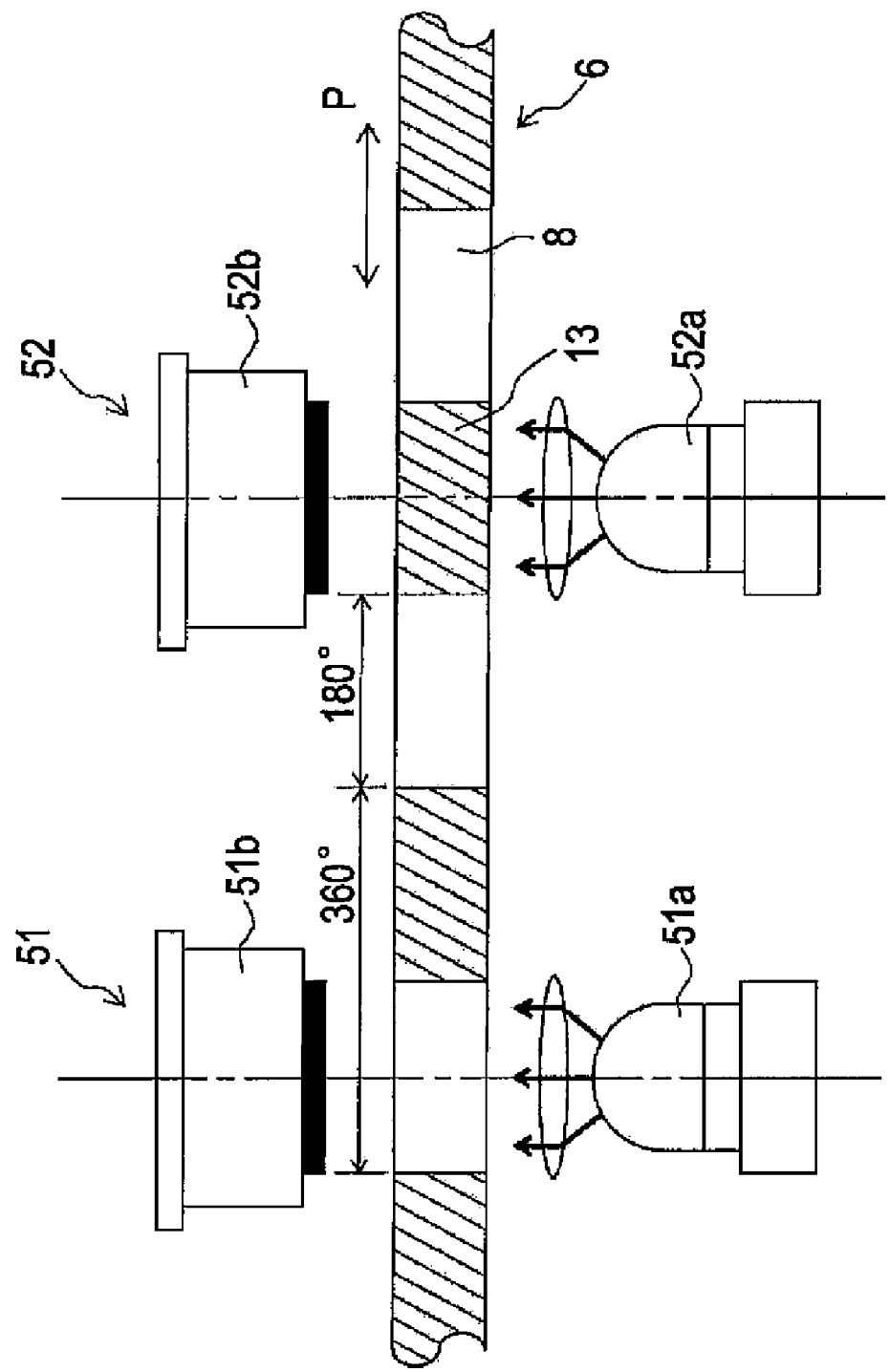
FIG. 15 is a sectional view of the positional relationship among the optical sensors 51 and 52 and the plate 6 in the case where the two optical sensors are provided so as to be out of phase by 180°.

The following description concerns, as shown in FIG. 15, optical sensor 51an example where, with respect to the position at which the including the light-receiving element 51b is disposed, the other optical sensor 52 is disposed at a position at which a detected voltage output from the other light-receiving element 52b is out of phase by 180°.

Figure 16:
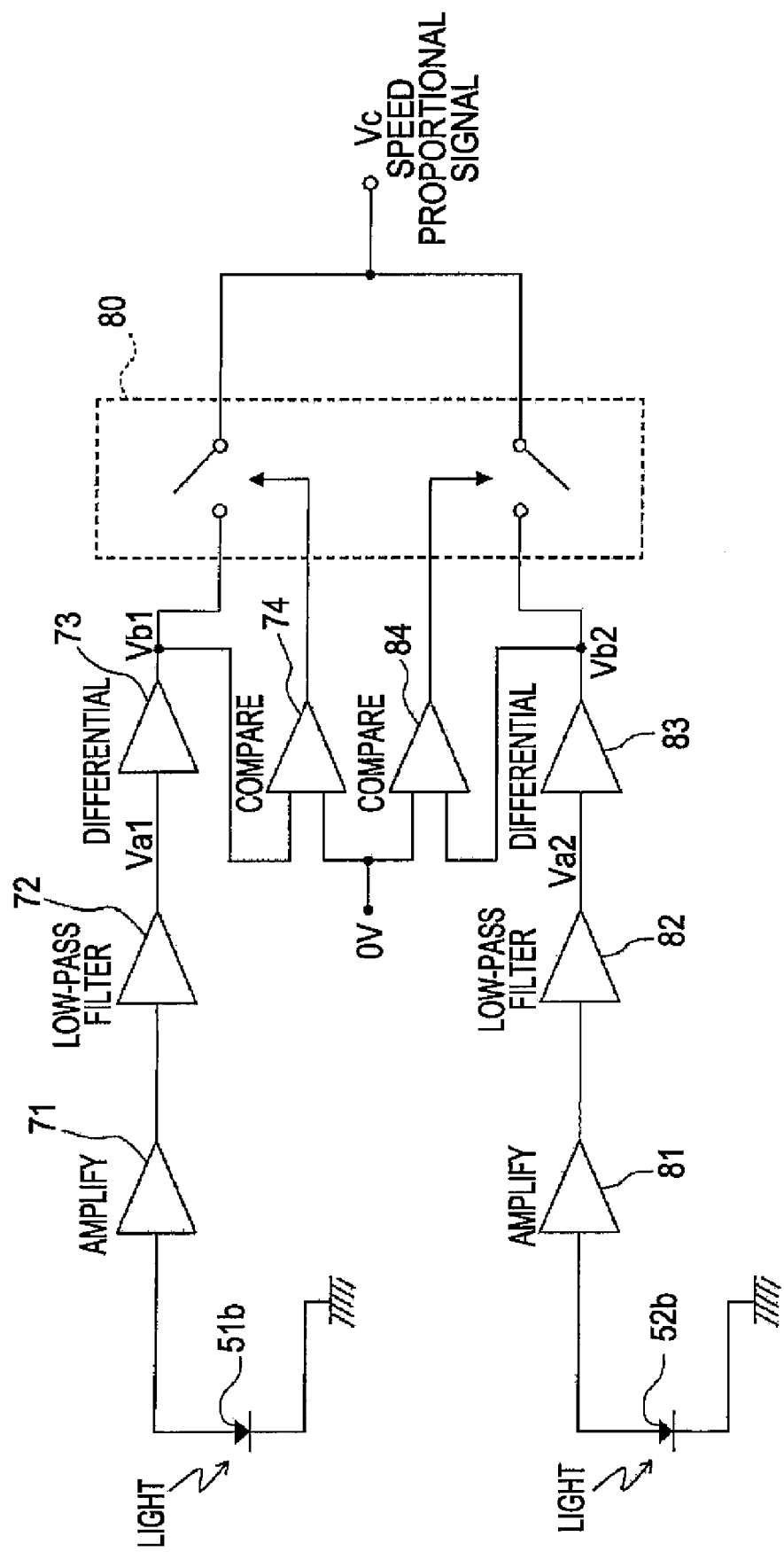
FIG. 16 is a circuit block diagram of the speed calculating circuit 9.
Figure 17:
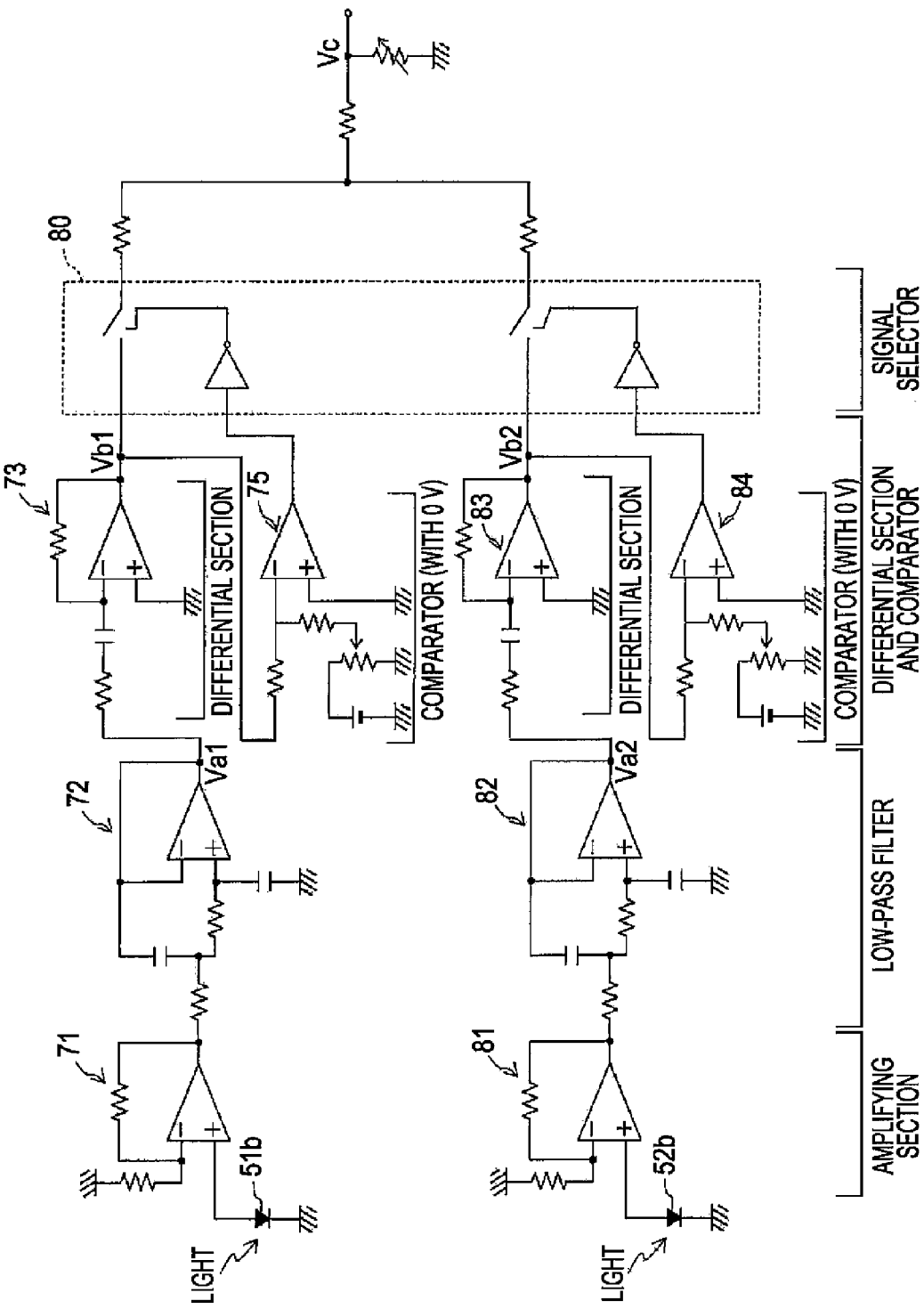
FIG. 17 is a specific circuit diagram of the speed calculating circuit 9 implemented by an operational amplifier.

FIG. 16 is a circuit block diagram of the speed calculating circuit 9. FIG. 17 is a specific circuit diagram of the speed calculating circuit 9 implemented by an operational amplifier.

On the basis of this circuit, the flow of a signal will be described. A light detection signal obtained by the light-receiving element 51b is amplified by an amplifying section 71 by a predetermined magnification factor. The amplified signal passes through a low-pass filter 72, whereby small changes such as noise on the signal waveform are removed. This signal is denoted by "Va1". Thereafter, the signal Va1 is differentiated by a differential section 73. The differentiated signal is denoted by "Vb1". The signal Vb1 is compared by a comparator 74 with a threshold of 0 V to determine whether the signal Vb1 is positive or negative.

In contrast, a light detection signal obtained by the light-receiving element 52b is amplified by an amplifying section 81 by a predetermined magnification factor. The amplified signal passes through a low-pass filter 82, whereby small changes such as noise on the signal waveform are removed. This signal is denoted by "Va2". Thereafter, the signal Va2 is differentiated by a differential section 83. The differentiated signal is denoted by "Vb2". A comparator 84 compares the signal Vb2 with a threshold of 0 V to determine whether the signal Vb2 is positive or negative.

The speed calculating circuit 9 further includes a switching circuit 80 for selecting one of the differential signal Vb1 of the differential section 73 and the differential signal Vb2 of the differential section 83.

FIG. 18(a) is a graph plotting the voltage waveforms Va1 and Va2 of the detection signals obtained by the light-receiving elements 51b and 52b. The voltage waveform Va1 changes in such a manner that the phase of the voltage waveform Va1 lags behind that of the voltage waveform Va2 by 180° (that is, inverted).

The voltage waveform Va1 is differentiated to yield the differential signal Vb1. The voltage waveform Va2 is differentiated to yield the differential signal Vb2.

The operation of the comparators 74 and 84 will be described.

The comparator 74 controls the switching so that the differential signal Vb1 can be output from the switching circuit 60 in a period where the differential signal Vb1 of the detection signal Va1 of the light-receiving element 51b is positive. Accordingly, as shown in FIG. 18(b), a speed proportional signal is obtained in a period from the signal switching point A to the signal switching point B.

The comparator 84 controls the switching so that the differential signal Vb2 can be output from the switching circuit G0 in a period where the differential signal Vb2 of the detection signal Va2 of the light-receiving element 52b is positive. Accordingly, as shown in FIG. 18(b), a speed proportional signal is obtained in a period from the signal switching point B to the signal switching point C.

With the above-described operation, the differential signal Vb1 can be obtained in a period where the slope of the detection signal Va1 of the light-receiving element 51b is positive. The differential signal Vb2 can be obtained in a period where the slope of the detection signal Va2 of the light-receiving element 52b is positive. Accordingly, as shown in FIG. 6(b), no signal is obtained in a transition period in which the slope of the differential signal Vb changes from positive to negative or from negative to positive, and hence, the speed proportional signal becomes more stable. Besides the absolute value of the speed, the sign of the speed (the direction in which the movable body moves) can be detected.

This stable speed proportional signal can be sent to the control unit 10, whereby the drive unit 11 can be controlled more accurately.

Figure 19:
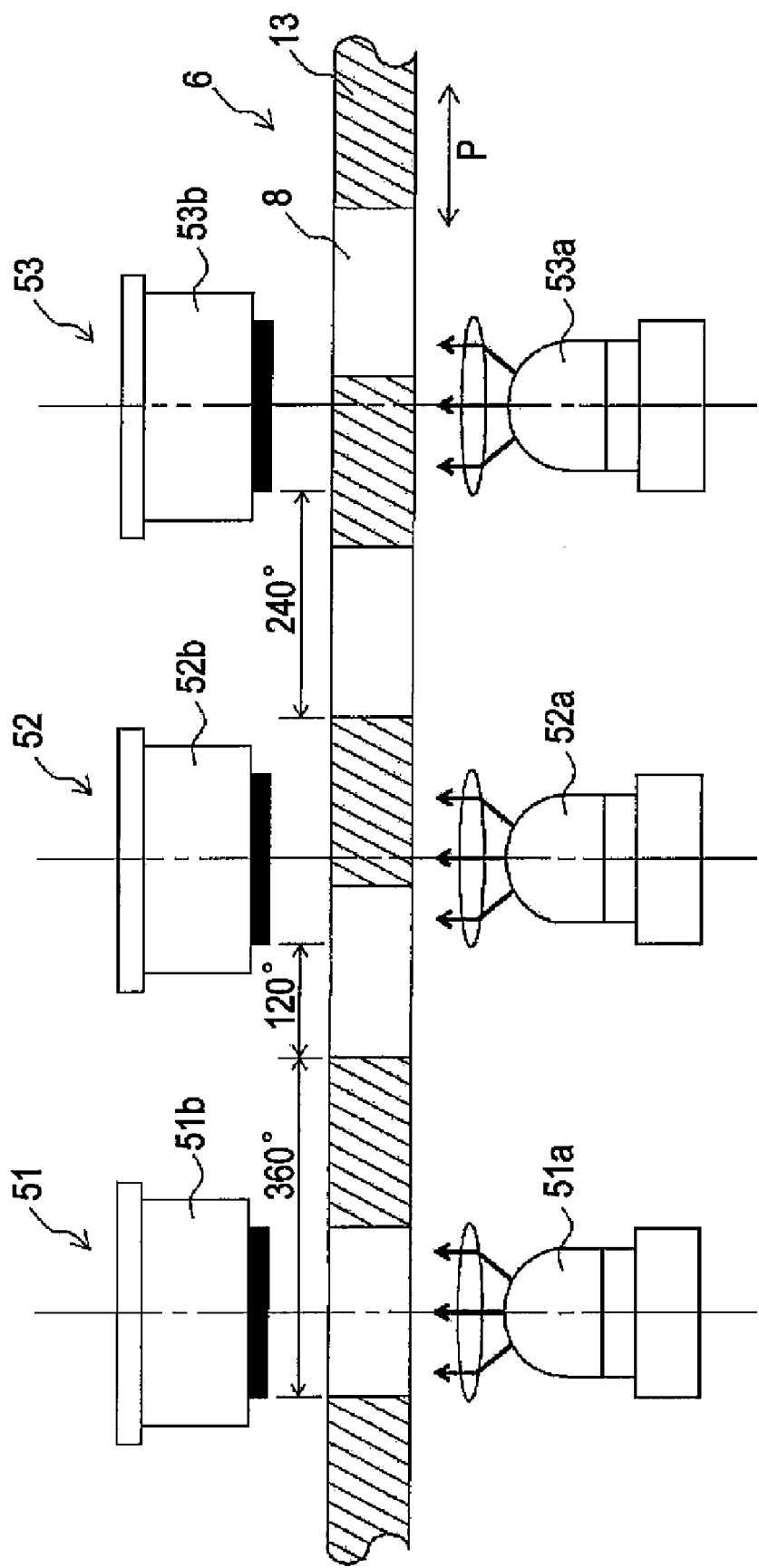
FIG. 19 is a sectional view of the positional relationship among the optical sensors 51, 52, and 53 and the plate 6 in the case where the three optical sensors are provided.

The following description concerns, as shown in FIG. 19, an example where, with respect to the position at which the optical sensor 51 including the light-receiving element 51b is disposed, the other optical sensor 52 is disposed at a position corresponding to a phase shift of 120 degrees, and yet another optical sensor 53 is disposed at a position corresponding to a further phase shift of 120 degrees.

Figure 20:
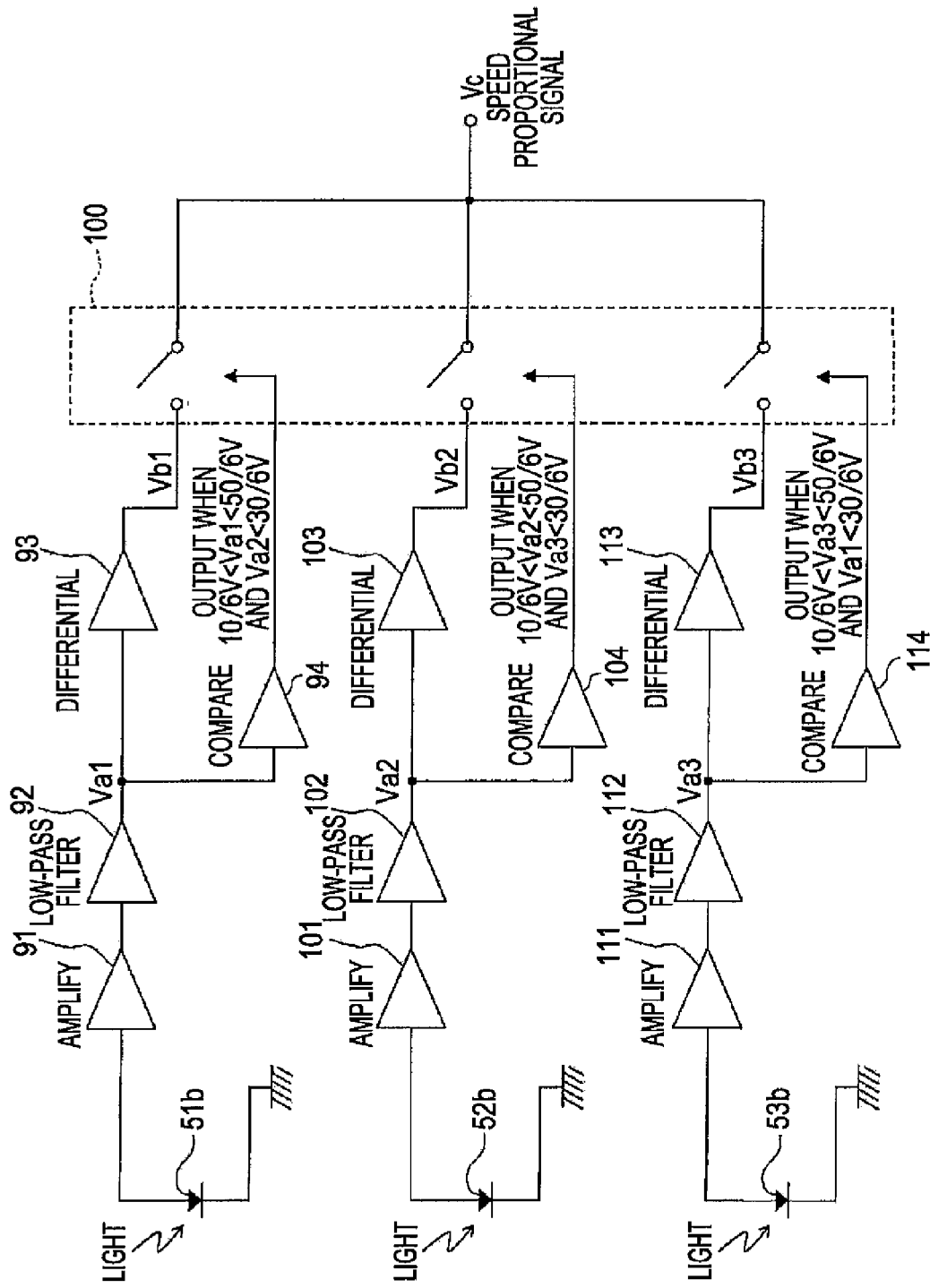
FIG. 20 is a circuit block diagram of the speed calculating circuit 9 in the case where there are three pairs of a light-receiving element and a light-emitting element.
Figure 21:
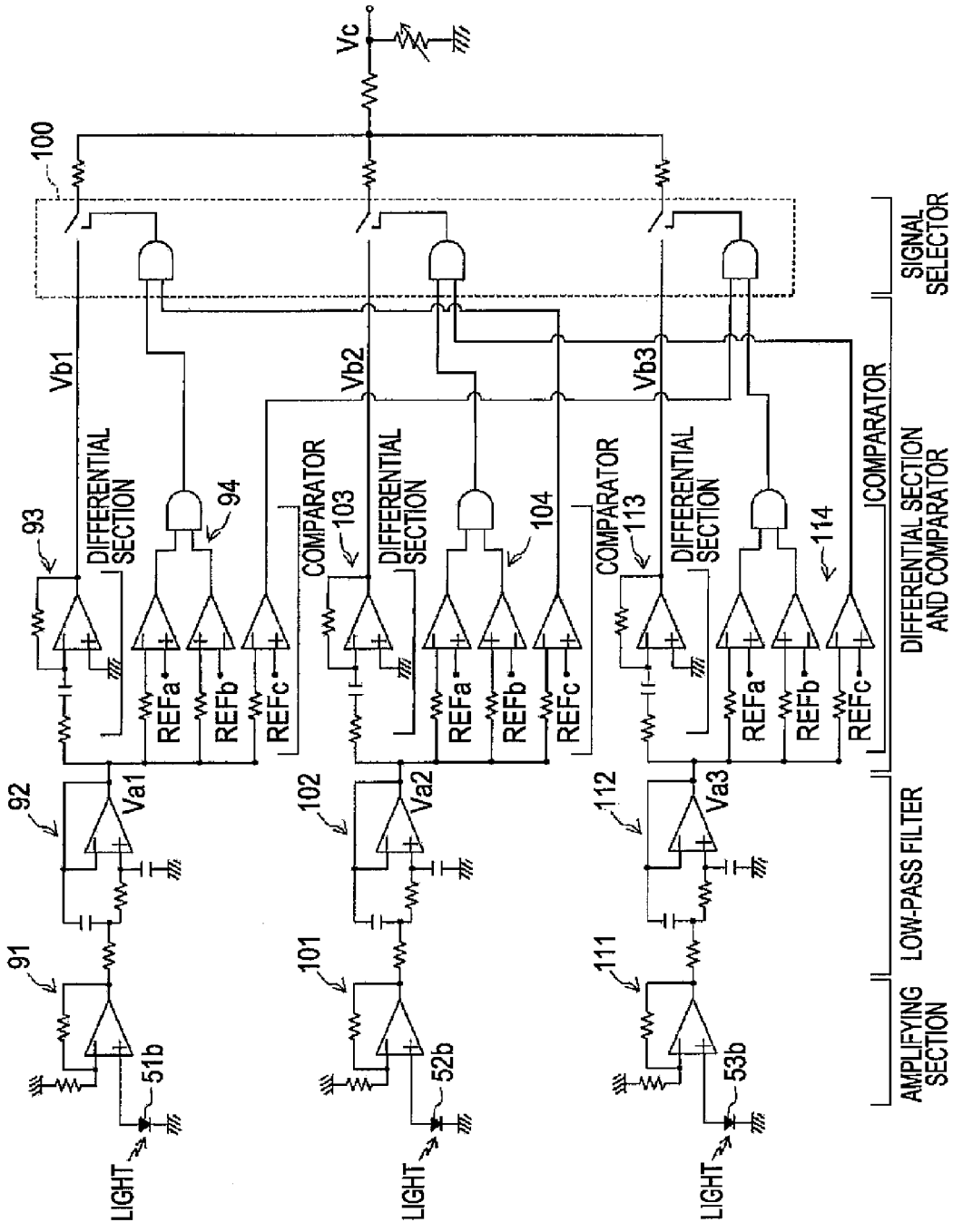
FIG. 21 is a specific circuit diagram of the speed calculating circuit 9 implemented by an operational amplifier.

FIG. 20 is a circuit block diagram of the speed calculating circuit 9. FIG. 21 is a specific circuit diagram of the speed calculating circuit 9 implemented by an operational amplifier.

Using this circuit, the flow of a signal will be described. A light detection signal obtained by the light-receiving element 51b is amplified by an amplifying section 91 by a predetermined magnification factor. The amplified signal passes through a low-pass filter 92, whereby small changes such as noise on the signal waveform are removed. This signal is denoted by "Va1". Thereafter, the signal Va1 is differentiated by a differential section 93. The differentiated signal is denoted by "Vb1". A comparator 94 compares the signal Va1 with thresholds of 10/6 V and 50/6 V, and compares the signal Va2 with a threshold of 5 V. In the case that the full scale of the signal is 10 V and that 10 V is divided by six, 10/6 V is the second value from the top, and 50/6 V is the second value from the bottom (the first value from the top is 10 V, and the first value from the bottom is 0 V). The threshold 5 V is the median.

In contrast, a light detection signal obtained by the light-receiving element 52b is amplified by an amplifying section 101 by a predetermined magnification factor. The amplified signal passes through a low-pass filter 102, whereby small changes such as noise on the signal waveform are removed. This signal is denoted by "Va2". Thereafter, the signal Va2 is differentiated by a differential section 103. The differentiated signal is denoted by "Vb2". A comparator 104 compares the signal Va2 with a threshold of 10/6 V and a threshold of 50/6 V, and compares the signal Va3 with a threshold of 5 V.

Further, a light detection signal obtained by the light-receiving element 53b is amplified by an amplifying section 111 by a predetermined magnification factor. The amplified signal passes through a low-pass filter 112, whereby small changes such as noise on the signal waveform are removed. This signal is denoted by "Va3". Thereafter, the signal Va3 is differentiated by a differential section 113. The differentiated signal is denoted by "Vb3". A comparator 114 compares the signal Va3 with a threshold of 10/6 V and a threshold of 50/6 V, and compares the signal Va1 with a threshold of 5 V.

The speed calculating circuit 9 further includes a switching circuit 60 for selecting one of the differential signal Vb1 of the differential section 93, the differential signal Vb2 of the differential section 106, and the differential signal Vb3 of the differential section 113.

FIG. 22(a) is a graph plotting the voltage waveforms Va1, Va2, and Va3 of the detection signals obtained by the light-receiving elements 51b, 52b, and 53b, respectively, in the case where the stage 3 moves in one direction. The voltage waveform Va2 changes in such a manner that the phase of the voltage waveform Va2 lags behind that of the voltage waveform Va1 by 120°. The voltage waveform Va3 changes in such a manner that the phase of the voltage waveform Va3 lags behind that of the voltage waveform Va2 by 120°.

FIG. 22(b) is a graph plotting the voltage waveforms Va1, Va2, and Va3 of the detection signals 51b, 52b, and 53b, respectively, in the case where the stage 3 moves in the opposite direction. The voltage waveform Va2 changes in such a manner that the phase of the voltage waveform Va2 leads that of the voltage waveform Va1 by 120°. The voltage waveform Va3 changes in such a manner that the phase of the voltage waveform Va3 leads that of the voltage waveform Va2 by 120°.

The operation of the comparators 94, 104, and 114 will be described.

In the case where the stage 3 moves in one direction, as shown in FIG. 22(a), the comparator 94 controls the switching of the switching circuit 100 so that the differential signal Vb1 of the differential section 93 can be output in a period where the detection signal Va1 of the light-receiving element 51b is between the threshold 10/6 V and the threshold 50/6 V and the voltage waveform Va2 is less than 5 V, that is, in a period from the signal switching point A to the signal switching point B.

The comparator 104 controls the switching of the switching circuit 100 so that the differential signal Vb2 of the differential section 103 can be output in a period where the detection signal Va2 of the light-receiving element 52b is between the threshold 10/6 V and the threshold 50/6 V and the voltage waveform Va3 is less than 5 V, that is, in a period from the signal switching point C to the signal switching point D.

The comparator 114 controls the switching of the switching circuit 100 so that the differential signal Vb3 of the differential section 113 can be output in a period where the detection signal Va3 of the light-receiving element 53b is between the threshold 10/6 V and the threshold 50/6 V and the voltage waveform Va1 is less than 5 V, that is, in a period from the signal switching point E to the signal switching point F.

The above-mentioned thresholds are set in order to extract the range in which the amount of light received is proportional to speed, and the thresholds are not limited to the above-mentioned numerals.

Accordingly, as shown in FIG. 22(c), a continuous speed proportional signal V is obtained.

In the case where the stage 3 moves in the other direction, as shown in FIG. 22(b), the comparator 94 controls the switching of the switching circuit 100 so that the differential signal Vb1 of the differential section 93 can be output in a period where the detection signal Va1 of the light-receiving element 51b is between the threshold 10/6 V and the threshold 50/6 V and the voltage waveform Va2 is less than 5 V, that is, in a period from the signal switching point G to the signal switching point H.

The comparator 104 controls the switching of the switching circuit 100 so that the differential signal Vb2 of the differential section 103 can be output in a period where the detection signal Va2 of the light-receiving element 52b is between the threshold 10/6 V and the threshold 50/6 V and the voltage waveform Va3 is less than 5 V, that is, in a period from the signal switching point K to the signal switching point L.

The comparator 114 controls the switching of the switching circuit 100 so that the differential signal Vb3 of the differential section 113 can be output in a period where the detection signal Va3 of the light-receiving element 53b is between the threshold 10/6 V and the threshold 50/6 V and the voltage waveform Va1 is less than 5 V, that is, in a period from the signal switching point I to the signal switching point J.

Accordingly, as shown in FIG. 22(c), a continuous speed proportional signal −V is obtained.

With the above-described operation, as shown in FIG. 22(c), the speed proportional signal V or −V can be obtained in a period where the value of the signal is stable, excluding the periods where the differential signals Vb1, Vb2, and Vb3 of the differential sections 93, 103, and 113 cross zero.

Accordingly, the speed proportional signal sent to the control unit 10 can be continuous, whereby the drive unit 11 can be controlled more accurately. Also, the direction in which the stage 3 moves can be advantageously detected by detecting the sign of the speed proportional signal V or −V.

Although the number of optical sensors provided is three in the above example, more optical sensors may be arranged. In general, in the case where n optical sensors are arranged, the n optical sensors are placed at intervals of 360°/n. The number of blocks of the speed calculating circuit corresponds to the number of optical sensors.

Figure 23:
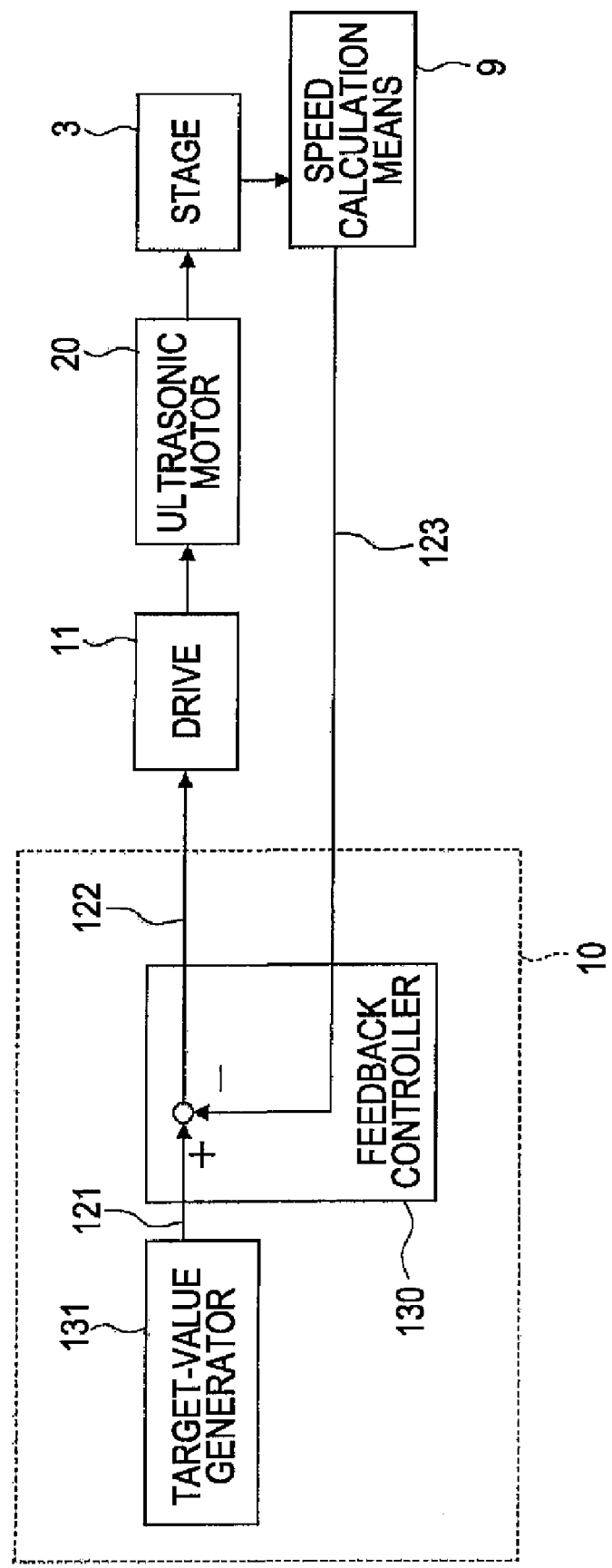
FIG. 23 is a block diagram of the drive stage according to the present invention.

Next, FIG. 23 is a block diagram of the drive stage in the case where the ultrasonic motor 20 is used as the above-described drive source serving as an example of the present invention.

The control unit 10 includes a feedback controller 130 and a target-value generator 131. A requested position of the stage 3 is given as a time function from the target-value generator 131 in which a preset movement profile of the stage 3 is stored, and is sent to the feedback controller 130. The current speed of the stage 3 is detected by the above-described speed calculating circuit 9, and the speed detected by the speed calculating circuit 9 is sent as a speed proportional signal to the feedback controller 130.

In the feedback controller 130, a speed deviation using two signals, namely, a requested-speed proportional signal 121 from the target-value generator 131 and an actual speed proportional signal 123 from the speed calculating circuit 9, is calculated, and PID arithmetic processing using a predetermined parameter is executed, thereby outputting an instruction signal 122 for determining the moving speed of the stage 3.

The instruction signal 122 is output as a final instruction signal to the drive unit 11 and an instruction voltage is output to the ultrasonic motor 20.

With such a control system, the control system is highly stable even in the case where the stage 3 moves in a complicated manner in which, for example, the stage 3 re-accelerates or decelerates from a constant-speed state, and hence the requested movement profile can be more reliably executed.

With the use of the speed detecting apparatus and the drive stage according to the present invention, the position accuracy of the stage 3 equivalent to or better than the performance heretofore can be achieved with a fewer components, lower cost, and easier maintenance than before. By mounting this drive stage to an apparatus in general involving movement of a stage or the like, the cost of the apparatus can be reduced.

Although the embodiments of the present invention have been described as above, the present invention is not limited to the above-described embodiments.

For example, the functions of the above speed calculating circuit 9 may be implemented by an operational amplifier. Alternatively, the functions of the speed calculating circuit 9 may be implemented by software operation using a microcomputer.

Figure 7:
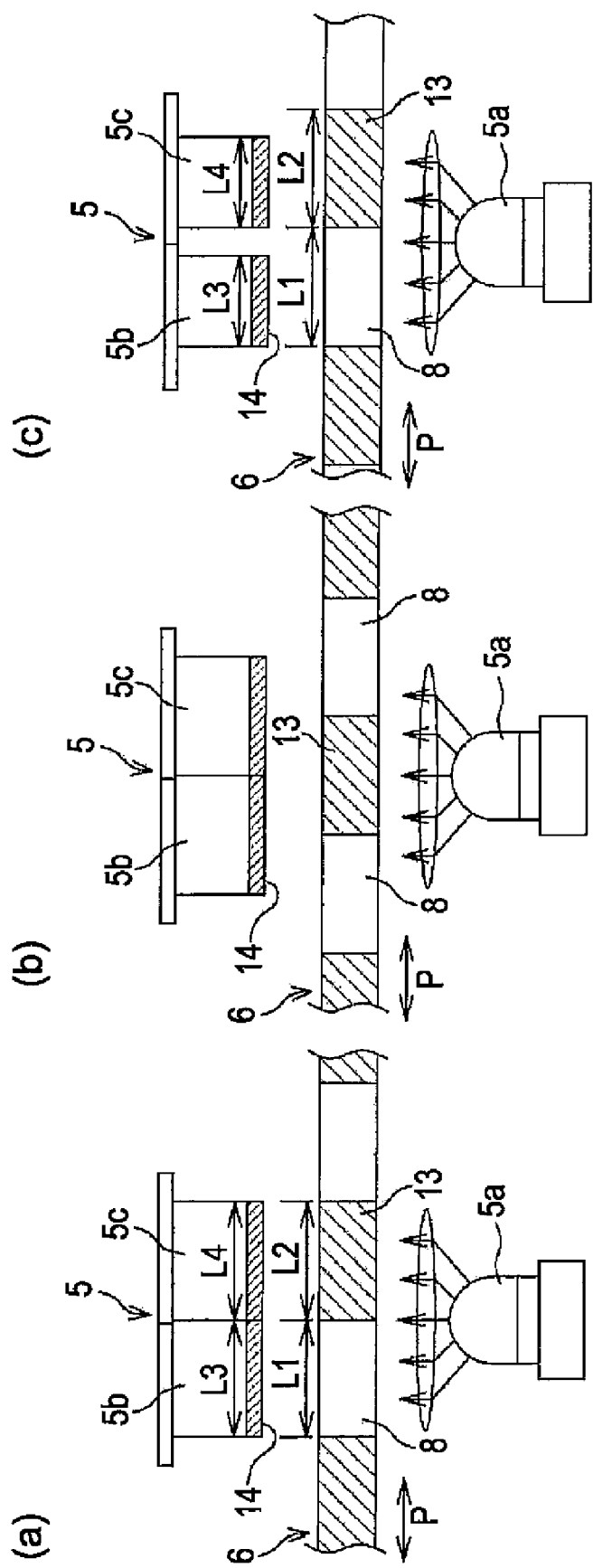
FIG. 7 includes sectional views of the positional relationship among the light-emitting element 5$a$, the light-receiving elements 5$b$ and 5$c$, and the plate 6.

The referential light-receiving element described in FIGS. 7 through 9 is applicable to the speed detecting apparatus of the present invention including two or more sensors. That is, referential light-receiving elements are placed adjacent to the respective light-receiving elements 51*b*, 52*b*, and the like, and the sum signal of the two light-receiving elements is used to control the amount of light emitted from the corresponding light-emitting element.

Although the above description concerns the case in which the speed of linear movement of the stage is detected, in the case where the stage rotates, the rotational speed of the stage can be detected.

Figure 24:
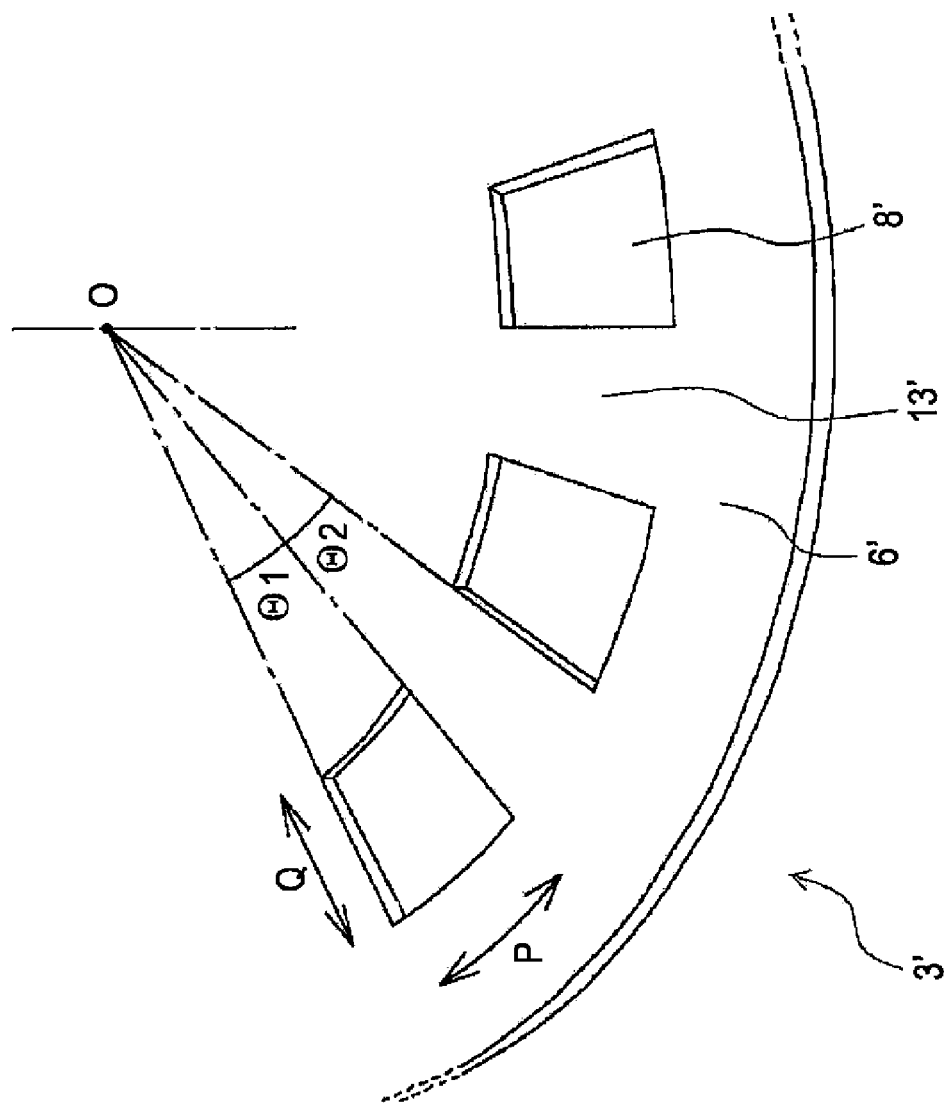
FIG. 24 is a perspective view of part of a rotation stage 3' that rotates around a principal axis O.

FIG. 24 is a partial perspective view of a rotational stage 3' that rotates around a spindle O. A discoid plate 6' is mounted around the outer periphery of the rotational stage 3'. A plurality of window sections 8' and blocking sections 13' covering the remaining area are disposed at the same distance from the spindle on the plate 6'. The angle defining each of the window sections 8' is θ1, and the angle defining each of the blocking sections 13' is θ2. A light-emitting element and a light-receiving element having an aperture are disposed on the respective top and bottom surfaces of the plate 6'. With the structure in which the stage 3' rotates, the distances L1 and L2 are replaced with the angles θ1 and θ2, respectively, and the above-described speed detection can be applied. Accordingly, the rotational speed of the stage 3' can be detected with a simple structure, and the rotational speed of the stage 3' can be controlled.

The length of the aperture 14 of the light-receiving element 5*b* and the length of the window sections 8 of the plate 6 in the direction Q perpendicular to the moving direction of the movable body need not coincide with each other. FIG. 25(*a*) shows an example where the length of the aperture 14 and the length of the window sections 8 in the direction Q coincide with each other. FIG. 25(*b*) shows an example where the length of the aperture 14 and the length of the window sections 8 in the direction Q do not coincide with each other. In either case, it is only necessary that the amount of light exceeding the sensitivity of the light-receiving element 5*b* be received.

In this specification, in the case where multiple optical sensors are provided, with respect to the position of one optical sensor, the position(s) of the other optical sensor(s) is defined by a phase difference. Note that there is a plurality of distances that achieve this constant phase difference. For example, FIG. 26 shows the positional relationship between an aperture 14*a* of one light-receiving element and an aperture 14*b* of another light-receiving element with a phase difference of 90° relative to the former light-receiving element. However, the aperture with a phase difference of 90° may be located at another position, as indicated by 14'*b* in the drawing. Such positions exist with a phase difference of an integral multiple of 360°.

EXAMPLE

An example of the present invention will now herein be described below.

An experiment was conducted in which the exemplary drive stage of the present invention shown in FIG. 1 was driven.

In this experiment, the stage 3 included in the drive stage was a 300 mm×300 mm×20 mm plate formed of alumina ceramics with a purity of 99.5%. The drive-power transfer member 4 was a 30 mm×30 mm×300 mm column formed of a composite material including alumina ceramics and titanium carbide. The total weight of the stage 13 and the drive-power transfer member 4 was measured to be 10 kg.

Cross roller guides with a length of 300 mm were used as the pair of guide members 2 for guiding the stage 3. An ultrasonic motor (SP-8 type) of Israel's Nanomotion Ltd. was used as the ultrasonic motor 20 serving as the drive source for the stage 3. As in the drive-power transfer member 4, the friction member 23 was made of the composite material including alumina ceramics and titanium carbide.

In the speed detecting apparatus of the present invention, an LED was used as a light-emitting element, and a photo diode was used as a light-receiving element. These elements were fixed to a support made of metal such that light emitted from the light-emitting element can enter the aperture of the light-receiving element and were screwed onto the base board 12, whereby the optical sensor 5 was constructed. On a metal plate 6 with a length of 70 mm and a width of 15 mm, window sections 8 with a width of 5 mm and a length of 1 mm were arranged at equal intervals (the length of a blocking section was 1 mm), at positions 5 mm from the width of the plate 6 so that the window sections 8 can move between the light-receiving and -emitting elements of the optical sensor 5 to perform light-receiving movement and blocking movement. The plate 6 was fixed by screws to the stage 3 parallel to the moving direction such that the plate 6 can move between the light-receiving and -emitting elements. Accordingly, the speed detecting apparatus was configured.

Thereafter, the drive stage of the present invention on which the above-described speed detecting apparatus was mounted was driven, and the driving accuracy thereof was inspected.

The drive stage was controlled on the basis of the block diagram shown in FIG. 23.

With the above-described apparatus configuration and control method, the drive stage of the present invention was driven.

With respect to speed information serving as a target value, the stage could be moved within a speed error of ±1%. It was thus confirmed that the speed of the stage was controlled with a speed error equivalent to that in the case of a speed sensor described in Patent Document 1 mentioned above in the background art.

The invention claimed is:

1. A movable-body-speed-detecting apparatus comprising:
   a movable body capable of moving linearly and/or circularly;
   a plate fixed to the movable body, the plate having a predetermined length in a direction in which the movable body moves; and
   light emission/reception means arranged such that light output from a light-emitting element enters a light-receiving element,
   wherein the plate has a window section that passes between the light-emitting element and the light-receiving element in accordance with movement of the movable body and that blocks or allows passage of light to the light-receiving element,
   wherein the light-receiving element has a first light-receiving element and a second light-receiving element that are arranged adjacent to each other in a direction in which the plate moves, and
   wherein the apparatus comprises light-amount-correcting means for correcting the amount of light emitted from the light-emitting element on the basis of the sum of light-amount detection signals obtained by the first light-receiving element and the second light-receiving element, and
   speed calculation means for calculating the speed of the movable body by converting the amount of light received by the first light-receiving element or the second light-receiving element into a signal and measuring the signal.

2. The movable-body-speed-detecting apparatus according to claim 1, wherein the speed calculation means includes a differential section for differentiating a signal corresponding to the amount of light received with respect to time, and the speed calculation means calculates the speed of the movable body on the basis of a value of a differential signal obtained by the differential section.

3. The movable-body-speed-detecting apparatus according to claim 2, wherein the number of the light emission/reception means provided is one, and
wherein the speed calculation means further includes an absolute-value generator for obtaining an absolute value of the value of the differential signal obtained by the differential section, and a speed proportional signal whose sign is not inverted is obtained by the absolute-value generator.

4. The movable-body-speed-detecting apparatus according to claim 1, wherein the light-receiving element has an aperture having a predetermined length in the direction in which the movable body moves, and the length of the window section of the plate and the length of the aperture are constant in a direction perpendicular to the direction in which the movable body moves.

5. The movable-body-speed-detecting apparatus according to claim 1, wherein light entering the light-receiving element is parallel light.

6. The movable-body-speed-detecting apparatus according to claim 5, wherein an internal edge of the window section of the plate is formed to be substantially parallel to the light entering the light-receiving element.

7. The movable-body-speed-detecting apparatus according to claim 1, wherein the plate includes the window section for receiving light and a blocking section for blocking light from reaching the light-receiving element, the window section and the blocking section being arranged alternately in the direction in which the movable body moves.

8. The movable-body-speed-detecting apparatus according to claim 7, wherein the length of the window section in the direction in which the movable body moves is substantially the same as the length of the blocking section in the direction in which the movable body moves.

9. The movable-body-speed-detecting apparatus according to claim 8, further comprising two or more light emission/reception means, and wherein two or more window sections are formed on the plate.

10. The movable-body-speed-detecting apparatus according to claim 9, wherein one of the light emission/reception means is placed so as to detect a light-receiving signal at a predetermined continuous cycle, and the other light emission/reception means is placed so as to detect a signal with a predetermined phase shift relative to the light-receiving signal.

11. The movable-body-speed-detecting apparatus according to claim 10, wherein the number of the light emission/reception means provided is two, and the two light emission/reception means are placed, in the direction in which the movable body moves, at positions corresponding to a phase difference of 180°,
wherein the speed calculation means includes two differential sections for differentiating signals corresponding to two amounts of received light with respect to time, and
wherein the speed calculation means includes a switching circuit for selecting, on the basis of time, one of values of differential signals obtained by the two differential sections.

12. The movable-body-speed-detecting apparatus according to claim 10, wherein the number of the light emission/reception means provided is n (n being an integer greater than or equal to three), and the n light emission/reception means are placed, in the direction in which the movable body moves, at positions corresponding to a phase difference of 360°/n,
wherein the speed calculation means includes n differential sections for differentiating signals corresponding to n amounts of received light with respect to time, and a comparator for determining a range in which each amount of light received is proportional to speed, and
wherein the speed calculation means includes a switching circuit for selecting, in accordance with a comparison result obtained by the comparator, on the basis of time, a speed signal having a value within the range in which the amount of light received is proportional to speed, from among values of differential signals obtained by the n differential sections.

13. The movable-body-speed-detecting apparatus according to claim 10, wherein the number of the light emission/reception means provided is n (n being an integer greater than or equal to two), and the n light emission/reception means are placed, in the direction in which the movable body moves, at positions corresponding to a phase difference of 360°/2n,
wherein the speed calculation means includes n differential sections for differentiating signals corresponding to n amounts of received light with respect to time, a signal inverter for inverting values of differential signals obtained by the n differential sections, and a comparator for determining a range in which each amount of light received is proportional to speed, and
wherein the speed calculation means includes a switching circuit for selecting, in accordance with a comparison result obtained by the comparator, on the basis of time, a speed signal having a value within the range in which the amount of light received is proportional to speed, from among the values of the differential signals obtained by the n differential sections.

14. The movable-body-speed-detecting apparatus according to claim 1, wherein the positional relationship among the first light-receiving element, the second light-receiving element, and the window section of the plate is set so that the fractional area of one of the first and second light-receiving elements being blocked is equal to the fractional area of the other light-receiving element being open.

15. The movable-body-speed-detecting apparatus according to claim 14, wherein a relationship exists such that the length of an aperture of the second light-receiving element is less than or equal to that of the window section of the plate.

16. A movable-body drive stage comprising the movable-body-speed-detecting apparatus according to claim 1 and a motor for driving the movable body, wherein the speed of the movable body is controlled by outputting speed information involved in movement of the plate, which is calculated by the speed calculation means, to a control unit for the motor.

17. A movable-body drive stage comprising:
a movable body capable of moving linearly and/or circularly;
a plate fixed to the movable body, the plate having a predetermined length in a direction in which the movable body moves; and light emission/reception means arranged such that light output from a light-emitting element enters a light-receiving element, wherein the plate has a window section that passes between the light-emitting element and the light-receiving element in accordance with movement of the movable body and that blocks or allows passage of light to the light-receiving element, wherein the light-receiving element has a first light-receiving element and a second light-receiving element that are arranged adjacent to each other in a direction in which the plate moves, wherein the apparatus comprises light-amount-correcting means for correcting the amount of light emitted from the light-emitting element on the basis of the sum of light-amount detection signals obtained by the first light-receiving element and the second light-receiving element, speed calculation means for calculating the speed of the movable body by converting the amount of light received by the first light-receiving element or the second light-receiving element into a signal and measuring the signal, and a motor for driving the movable body, and wherein the speed of the movable body is controlled by outputting speed information involved in movement of the plate, which is calculated by the speed calculation means, to a control unit for controlling the motor.

* * * * *